United States Patent [19]
Foy, Jr. et al.

[11] 3,752,966
[45] Aug. 14, 1973

[54] DRILL BIT UTILIZATION OPTIMIZER

[75] Inventors: Fred P. Foy, Jr., Fullerton; Nuke Ming Chang, San Francisco, both of Calif.

[73] Assignee: Santa Fe International Corporation, Los Angeles, Calif.

[22] Filed: May 28, 1971

[21] Appl. No.: 147,887

[52] U.S. Cl................ 235/150.1, 73/151.5, 175/40, 235/151, 235/193
[51] Int. Cl........................ G06f 15/46, E21b 45/00
[58] Field of Search............. 235/150.1, 151, 151.3, 235/151.32, 184, 193; 73/151, 151.5; 324/1; 175/39, 40, 45; 166/64–66; 340/18; 173/20–21

[56] References Cited
UNITED STATES PATENTS

| | | | |
|---|---|---|---|
| 3,364,494 | 1/1968 | Dellinger et al. | 175/40 X |
| 3,566,478 | 3/1971 | Hurlston | 73/151 X |
| 3,541,852 | 11/1970 | Brown et al. | 73/151.5 X |
| 3,260,998 | 7/1966 | Fluegel | 235/151 X |
| 3,522,727 | 8/1970 | Calhoun | 73/151.5 |
| 3,396,788 | 8/1968 | Bell | 166/66 X |
| 3,396,787 | 8/1968 | Vann | 166/66 X |
| 3,581,564 | 6/1971 | Young | 175/39 X |
| 3,525,406 | 8/1970 | Hart | 175/40 X |
| 3,660,649 | 5/1972 | Gilchrist et al. | 235/193 |

Primary Examiner—Eugene G. Botz
Assistant Examiner—Jerry Smith
Attorney—Le Blanc & Shur

[57] ABSTRACT

Disclosed is a special purpose digital data processor to generate information for optimizing the utilization time of a drilling bit for oil wells, etc. The system includes a series of registers for storing constant and variable numbers, an arithmetic unit, an input multiplexer for providing data from the input registers to the arithmetic unit and program control logic for operating the input multiplexer and arithmetic unit at preselected intervals to solve the equation:

$$C = [B + (T + D)R]/F$$

where:
 $C =$ footage cost in $ per foot;
 $B =$ bit cost in $;
 $D =$ drilling time in hours;
 $T =$ bit change round trip time in hours;
 $R =$ rig cost in $ per hours; and
 $F =$ footage drilled in feet.

Information output is provided by a printer and an light emitting diode numeral display. Also, means may be provided to indicate when the result of a computation of footage cost exceeds the numerical of the immediately previous computation.

33 Claims, 7 Drawing Figures

DRILL BIT UTILIZATION OPTIMIZER

INTRODUCTION AND BACKGROUND

The present invention relates to well drilling, and more particularly to a technique for optimising the economical life time of a drill bit in terms of minimum average cost per foot of the hole being drilled.

As is known, oil wells are normally drilled by means of a rotating bit suspended at the lower end of a string of drill pipe sections. The latter are supported by a drilling rig mounted on the surface of the earth, or an offshore drilling platform. The bit is formed with a number of cones, bearing-mounted on the drilltip, each cone carrying teeth formed of diamond or other suitable material. As the drill bit advances into the earth, additional sections of drill pipe, typically about 30 feet long, are added to the drill string. The entire assembly is rotated from the drilling derrick at a constant speed with a constant applied force.

During the drilling operation, the drill bit wears, for example, due to tooth wear or cone bearing damage. As a result, the penetration rate of the bit into the earth is gradually reduced. Ultimately, (when the teeth wear sufficiently) the penetration rate reaches a point at which operating efficiency is so low that the bit must be replaced. Cone-bearing wear may cause similar problems. In addition if a cone bearing fails, the cone may drop into the bore-hole. This is a major problem since the cone can not be destroyed simply by "drilling through" it. Rather, it must be retrieved — a costly and time consuming operation.

In any case, the bit must be removed from the bore-hole by disassembling the drill string section by section. Thereafter, the drill string is reassembled with a new bit and lowered to the bottom of the bore-hole, and the drilling operation begins again.

For a deep hole, "pulling" the bit and reassembling the drill string may require 10 hours or more. Of course, no drilling process is being made during this time, but the hourly cost of maintaining and operating the drilling rig continues to accrue. By way of example, a typical bit costs approximately $200 and has an operating life on the order of ten hours; the cost of maintaining and operating a rig for that period could be $2,000 or more.

From the foregoing it will be apparent that initially the cost per foot of the hole drilled with a new bit is quite high due to the cost of the bit and the accrued rig expenses during the trip time. As the number of feet drilled with the bit increases, it is found that the average cost per foot drops even though the bit is wearing and its penetration rate decreases. Ultimately, the penetration rate becomes so low in relation to the bit cost and the trip time that the average cost per foot begins to increase. Optimum utilization of the bit requires that it be changed at or near the time that the average cost per foot begins to rise from its minimum value. An informed and careful judgment must therefore be made as to when to pull and replace a bit in order to assure minimum cost per foot of the hole being drilled.

Unfortunately, the customary practices followed in determining when to pull bit are quite unsatisfactory. Basically, the driller must rely on his experience, taking into account the particular bit being employed, the geological formations in which the drilling operation is taking place, etc., and of course, the number of feet per hour actually being drilled. The driller's experience is based on and supplemented by after the fact calculations of actual drilling cost per foot, but such calculations are seldom available quickly enough to be of value on a "real time" basis.

Moreover, the driller's task in determining when to pull the bit is considerably complicated by the act that there is no readily apparent characteristic of the change in penetration rate as a function of time from which even an experienced driller can identify the optimum time to pull and replace a bit, i.e., the time at which the drilling cost per foot begins to rise.

For some time, it has been recognized that the cost of a particular bit and the hourly cost of maintaining and operating the drilling rig as well as the approximate round trip time to change a bit and the actual number of feet drilled can provide a meaningful estimate of the optimum drill bit life time, and several techniques for utilizing this information have been proposed. One such technique employs a mechanical analog computer for generating a curve representing the ratio:

$$(K + T)/F \quad (1)$$

where:
$K$ = the "preparatory" time including the round trip time to change the bit plus an equivalent time based on the bit cost;
$T$ = the drilling time; and
$F$ = the number of feet drilled.

The value of the aforementioned expression is provided on a continuous basis on a special chart which the driller may inspect periodically to determine when a bit should be pulled.

This arrangement is subject to several disadvantages including the need for a special chart, and some degree of inconvenience in setting up the machine and interpreting the results. Also, the nature of the mechanism employed is somewhat disadvantageous from the standpoint of reliability. In any case, though it has been available for some years, the above mentioned technique does not appear to enjoy widespread use as far as can be determined.

Several other techniques for optimizing drill bit utilization have also been proposed involving various more complicated formulas, but do not provide a particularly meaningful measure of the average cost per foot of the hole being drilled and/or are not conveniently usable by a driller on a "real time" or "on-line" basis in the field.

BRIEF DESCRIPTION OF INVENTION

The present invention seeks to overcome the disadvantages of the prevailing method involving informed guesswork, and of the various contrivances heretofore proposed, by employment of a special purpose digital processor arranged to provide repetitive solutions of the equation:

$$C = [B + (T + D)R]/F \quad (2)$$

where:
$C$ = cost per foot of the hole being drilled;
$B$ = bit cost in $;
$T$ = round trip bit changing time in hours;
$D$ = actual time drilled;

R = rig cost in $ per hour;
F = number of feet actually drilled.

The system includes input registers for storing continually updated information as to the operating time and footage drilled, and a series of manually settable input registers for storing constant values of bit cost, estimated trip time to pull and replace the bit, and the fixed hourly cost of operating and maintaining the drilling rig. Also provided are an arithmetic unit for solving equation 2 above, and a input data multiplexer for providing the data stored in the registers to the arithmetic unit. A program control unit operates the multiplexer and the arithmetic unit to generate on a repetitive basis, solutions to equation 2 above.

As each solution is generated, it is displayed for convenient observation by the driller on a paper tape and, if desired, on a light emitting diode (LED) display.

Since the output is provided in terms of dollars per foot, it is quite simple for the driller to recognize when the optimum drill bit life time has been reached, even without the alarm indication. However, for the driller's convenience, there may be provided a minimum value detector which compares the result of a calculation with the result of a previous calculation and provides an indication such as an audible alarm when the average cost per foot rises between two successive calculations.

The system is constructed of commercially available integrated circuit logic and other elements, and is thus simple and reliable and relatively inexpensive. Further, the arithmetic unit can be constructed in such a manner that it may be utilized independently as a versatile small scale electronic calculator.

Because the system is convenient to use, and provides a rapid indication of the result in terms which are meaningful to the driller, it can be used for several purposes related to that described above. For example, drill bits of various kinds are constructed for use in different geological formations. Typically, use of a bit in a formation to which it is unsuited is economically disadvantageous. Thus, if such a formation is encountered during drilling, the average cost per foot may begin to rise, perhaps long before the bit is worn. By use of the system of this invention, the driller immediately knows that optimum economical utilization of the drill bit is not being achieved. information as to the nature and possible depth of the formation can be obtained from the well logging crew based on analysis of the drilling fluid or "mud" pumped up from the bore-hole (a routine procedure normally followed in all drilling operations.) Based on this, the driller may determine whether to pull the bit and substitute a more suitable one (if the adverse formation is extensive) or simply to proceed through (if the formation is not extensive enough to warrant the time lost in changing bits.)

Another related operation which may be improved by use of the new system is optimization of drilling conditions in economic terms. As is known, the force applied to the bit, the drill speed (rpm), the drilling mud pressure, and other factors all effect the penetration rate. An experienced driller can adjust these parameters to meet changing conditions, but this is much more an art than a science. Using the new system, the driller can make such changes as are dictated by his experience, and can quickly determine the effect of his changes on the penetration rate in terms of changes in the average cost per foot of the hole — the ultimate economic criterion.

Accordingly, it is an object of this invention to provide an improved technique for optimizing the utilization time of a drill bit.

It is another object of this invention to provide a special purpose digital data processor for generating repetitive solutions of equation 2 set forth above.

Another object of this invention is to provide such a device which is relatively inexpensive and simple and convenient to operate and sufficiently rugged and reliable for field use in both land based and offshore oil well drilling operations.

Another object of this invention is to provide such a device comprising input registers for constantly receiving updated information as to the total operating time of a drill bit and the number of feet drilled, and manually adjustable input registers for storing information concerning the hourly operation and maintenance cost of the drilling rig, the cost of the bit being used, and the estimated hours required to pull and change a bit, an arithmetic unit, an input multiplexer for coupling information from the input registers to the arithmetic unit, an output printer or other similar display device for presenting the results of successive solutions of equation 2 above.

It is a related object to provide a device as described above in which the results of successive calculations are compared to provide an indication when the average cost per foot of the hole being drilled at the time of a calculation exceeds the cost at the time of the immediately previous calculation.

The exact nature of this invention, as well as other objects and advantages thereof will become apparent from consideration of the following detailed description taken in conjunction with the drawing in which.

DETAILED DESCRIPTION OF INVENTION

Figure 1:
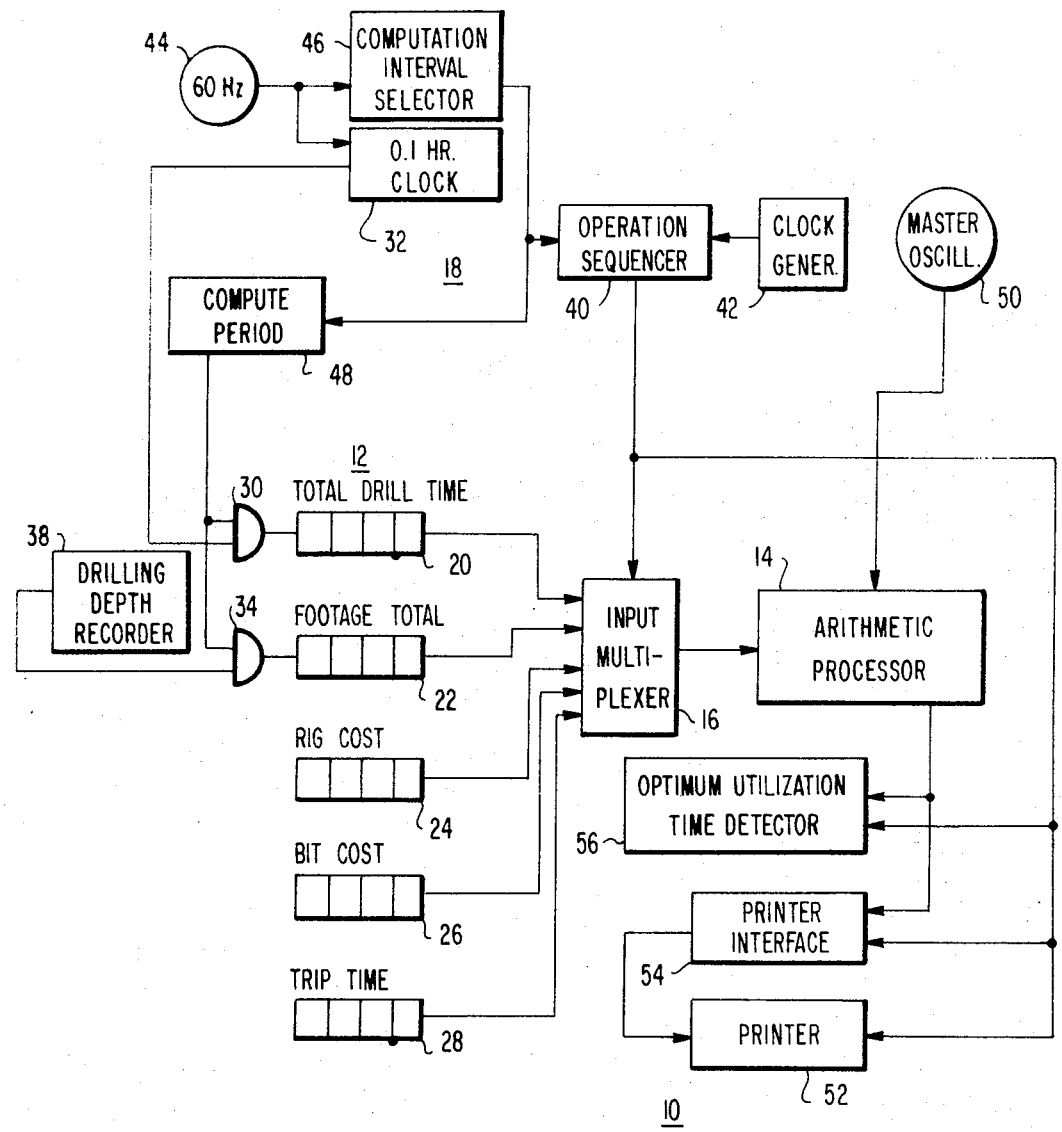
FIG. 1 is an overall block diagram showing the essential features of the special purpose digital data processor in accordance with this invention.

Turning now to FIG. 1, the system generally denoted at 10 includes an input register section generally denoted 12, an arithmetic unit 14, an input multiplexer 16 and a program control unit generally denoted at 18.

Input register section 12 comprises a pair of externally controlled register stages 20 and 22 for recording total drill time and footage drilled, respectively, and three manual registers 24, 26 and 28 for recording fixed values of rig cost, bit cost, and trip time, respectively. Register 20 is connected through a control gate 30 to a 0.1 hour clock 32 in program control subsystem 18 to record actual drilling time in 6 minute increments. Footage total register 22 is connected through a control gate 34 to a drilling depth recorder 38, which is preferably the conventional borehole depth measuring equipment available on the drilling rig with suitable means for converting the motion of the drilling depth recorder mechanism into a series of electrical pulses, for example, 1 pulse for each foot of borehole penetration.

Rig cost register stage 24, bit cost register stage 26 and trip time register stage 28 are manually adjustable devices which are set at the beginning of an operation to store the constant values of rig cost (dollar per hour), bit cost (dollars) and the estimated trip time in hours, based on the driller's estimate based on the expected length of the drill string at the time the bit is to be pulled.

Considering equation 2 above, it is apparent that a sequence of arithmetic operations (addition, multiplication, division) must be performed on the data contained in input register stages 20 through 28. This data is provided at the appropriate time through input multiplexer 16 to arithmetic processor 14 under control of an operation sequence unit 40 included in control subsystem 18. The control signals provided by operation sequencer 40 activate multiplexer 16 to couple the output of respective register stages to the arithmetic processor, and also actuate the multiplexer to provide arithmetic operation commands for processor 14 as hereinafter explained.

In addition to 0.1 hour clock 32 and operation sequencer 40, control logic unit 18 includes a clock generator 42 for advancing the operation sequencer through its program cycle, and a 60 Hz clock 44 which actuates 0.1 hour clock 32. The latter comprises a series of divider stages arranged to convert the 60 Hz pulse train into a series of pulses at 6 minute intervals. 60 Hz clock 44 also actuates a computation interval selector 46. This is also a frequency divider arranged to provide actuating signals for operation sequencer 40 at selected intervals, for example, every 15 minutes, or 30 minutes, or every hour. Computation interval selector 46 also controls a compute period signal generator 48 which deactivates control gates 30 and 34 during a computation period to prevent change of the information stored in register stages 20 and 22 during the arithmetic operation. Control logic subunit 18 also includes a master oscillator 50 for controlling the internal operations of arithmetic processor 14.

The system of FIG. 1 also includes data utilization equipment comprising a printer 52 coupled to the output of arithmetic unit 14 through an interface unit 54. Both printer 52 and interface unit 54 are controlled by operation sequencer 40 to provide a permanent result of each successive calculation in accordance with equation 2. Also, there may be provided an optimum utilization time detector unit 56 which responds to successive solutions of equation 2 to sense the time at which the average cost per foot of hole being drilled begins to increase. Detection of this condition may be employed to actuate an alarm, or to provide some other readily apparent indication to the driller that the bit should be pulled and replaced.

Turning now to FIGS. 2 through 6, there is shown a more detailed block diagram presenting functional and organizational features of a preferred embodiment of the system shown in FIG. 1. Representative operating waveforms are shown in FIG. 7. For ease of illustration and description, many details of construction are omitted and various logical functions grouped, and described in connection with collective functional blocks. The actual circuitry of each of these blocks is described generally, wih reference to standard commercially available integrated circuit logic elements for accomplishing the specified functions. The actual circuit configurations represented by these functional blocks do not per se constitute a part of this particular invention and detailed description is omitted in the interest of presenting a clearer and more concise description of overall essential structure and function.

The system of FIGS. 2 – 6 is built around a commercially available integrated circuit arithmetic unit, the EA S-100, manufactured by Electronic Arrays, Inc., Mountain View, Calif. This device, constructed by large scale integration techniques of metal oxide semiconductor elements, is capable of performing addition, subtraction, multiplication and division operations on 8 digit inputs with a 16 digit internal operating capacity. Data output is provided in the form of a binary coded decimal 8421 code for each of eight output digits. A one-of-eight decoder output identifies the digit. The output data continuously circulates until a new arithmetic operation is performed. Other comparable integrated circuit arithmetic units, or a specially constructed processor employing medium and small scale integration units may be employed instead, with appropriate variation in the control logic.

The output printer employed is the EP-101, manufactured by the Suwa Seiko Company. This unit prints a 21 character line by means of a rotating print drum which carries 21 laterally spaced peripheral rows of characters. Separate print hammers engage the print wheel with a paper tape when a desired character is aligned in printing position. Again, however, as in the case of the arithmetic unit, other printout mechanisms may be employed with appropriate modifications of the control logic, if necessary.

Figure 2:
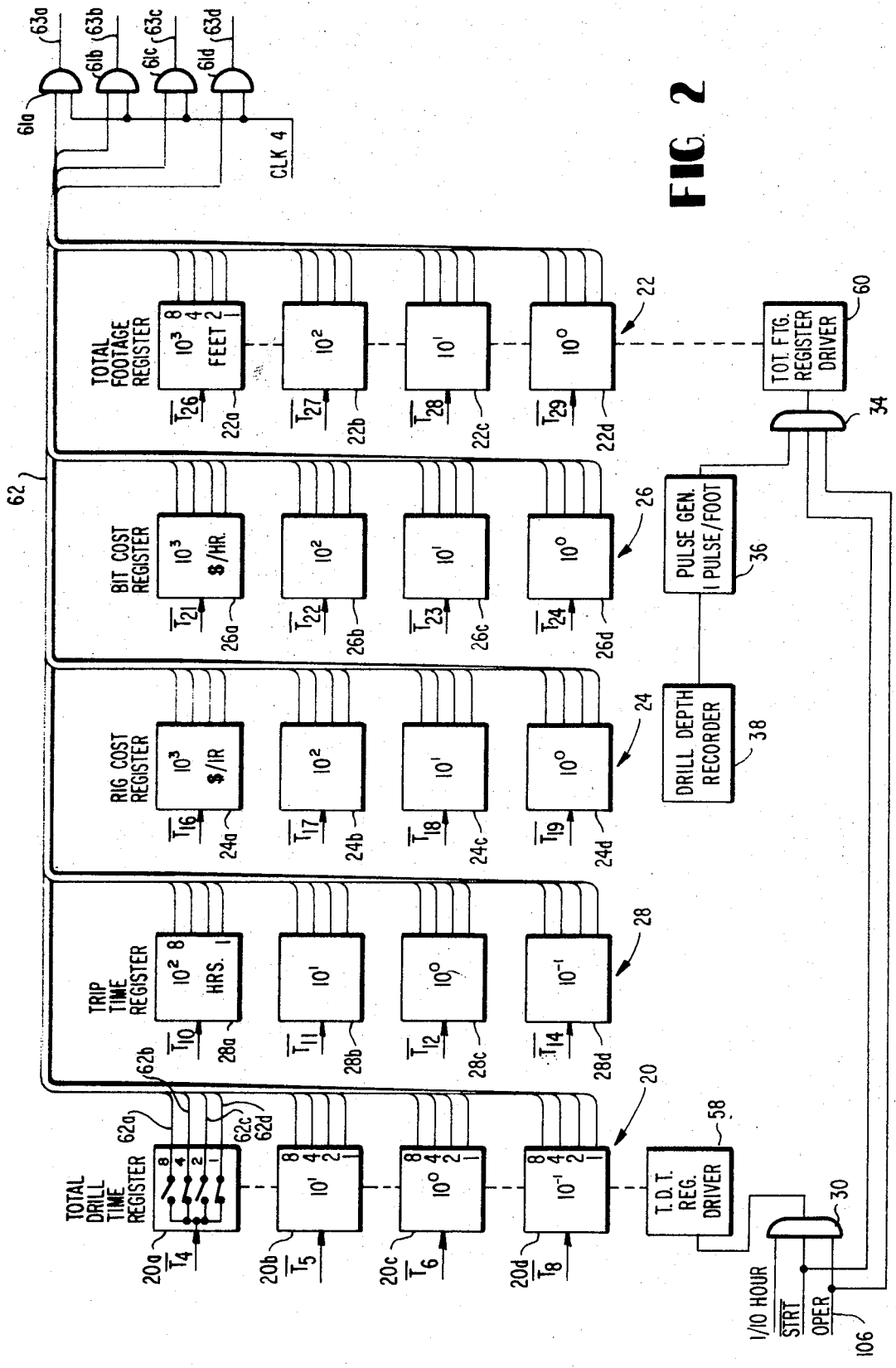
FIG. 2 is a detailed functional diagram of the input data registers.

Referring now to FIG. 2, there is shown the input register unit 12 comprising total drill time register 20, footage total register 22, rig cost register 24, bit cost register 26 and trip time register 28. Each of registers 20 through 28 is designed to store a four digit decimal number and to provide an 8421 binary coded decimal representation of each digit. Thus, each register comprises four stages, one for each digit. For register 20, stages 20a – 20d store a maximum time representation of 999.9 hours. Register stages 22a – 22d store a maximum footage drilled of 9,999 feet, stages 24a – 24d store a representation of rig cost up to 9,999 dollars/hour, stages 26a – 26d store a bit cost representation up to $9,999, and stages 28a – 28d store a maximum estimated trip time up to 999.9 hours.

Associated with each of registers 20 and 22 are respective register drivers 58 and 60. These are representative of a suitable mechanism for operating registers 20 and 22 in response to external signal. Actually devices of this type, intended for use as multidigit registers are readily available commercially.

A preferred unit is the Unipulser Series 49000 decade counter manufactured by the Durant Manufacturing Company of Milwaukee, Wisc. However, it will be understood that other similar and equivalent units are available and may be employed. As illustrated functionally for Unipulser counter stage 20a, each of stages 20a–20d and 22a – 22d comprise four internal contact sets arranged to be closed in the proper pattern to generate the 8421 binary coded decimal code as the register cycles in response to inputs to drivers 58 and 60. One of the contacts of each contact pair is connected to a respective lead 62a – 62d of a four wire cable 62. The other contacts of each contact pair are connected in common to a single input. For counter stage 20a, this input is provided by the $\overline{T_4}$ signal generated by operation sequencer 40 (see FIG. 1) in control logic sununit 18. As explained more fully hereinafter, xcept when the information contained in a counter stage is to be "read out" the input signal $\overline{T_4}$ is high and the four contact pairs provide high signal levels (or open circuits) on all four of wires 62a–62d in cable 62. When counter stage 20a is to be read out the $\overline{T_4}$ input signal goes low and the signal pattern on the four leads in cable 62 is determined by the closure pattern of the contact pairs. For the configuration illustrated, the 8 and 2 contact pairs are open so the signals on leads 62a and 62c remain high. The 4 and 1 contact pairs are closed so the low level of the $\overline{T_4}$ signal appears on leads 62b and 62d.

Since all the outputs of register stage 20a are high irrespective of the stored count unless the $\overline{T_4}$ signal is low, stages 20b, 20c, and 20d may be connected in common to leads 62a – 62d, as illustrated. Stage 20b is then read out by the $\overline{T_5}$ signal from the operation sequencer 40. Similarly stages 20c and 20d are read out by the $\overline{T_6}$ and $\overline{T_8}$ signals, respectively.

Total footage register 22 is identical to register 20. Again, the contact pairs of stages 22a – 22d are connected in common to the respective leads 62a – 62d. Stages 22a – 22d are read out by the $\overline{T_{26}} - \overline{T_{29}}$ signals respectively from operation sequencer 40.

Functionally, the output signal properties of rig cost register 24, bit cost register 26, and trip time register 28 are identical to those of registers 20 and 22. Each counter stage of registers 24 – 28 provides an 8421 binary coded decimal output on leads 62a – 62d through respective sets of contact pairs when actuated by read out signals from operation sequencer 40. As illustrated, stages 24a – 24d are read out by signals $\overline{T_{16}} - \overline{T_{19}}$, stages 26a – 26d are read out by signals $\overline{T_{21}} - \overline{T_{24}}$ and stages 28a – 28d are read out by signals $\overline{T_{10}} - \overline{T_{12}}$ and $\overline{T_{14}}$.

in contrast to registers 20 and 22, registers 24 – 28 serve only to store preset values of constant terms and factors rather than variables which must be continuously updated. Thus, registers 24 – 28 are subunit with manual rather than automatic setting except Many devices of this type are available, but the preferred type are thumb-wheel adjustable switches such as the Digiswitch or Miniswitch manufactured by the Digitran Company, Pasadena, Calif. cable Thus considering all of registers 20 – 28, it will be appreciated, that as each of the register stages is activated by the respective ones of the $\overline{T}$ signals from operation sequencer 40, an 8421 BCD pattern appears on the individual leads 62a through 62b of cable 62.

Data provided over leads 62a through 62d are coupled through respective AND gates 61a – 61d over leads 63a – 63d. AND gates 61 are conditioned by the CLK4 signal described below. The BCD signal patterns on leads 63 serve as operands for the calculations required in solving equation 2. These calculations are performed by arithmetic unit 14 illustrated in FIG. 3 in response to signals from control logic unit 18 illustrated in FIG. 4.

Figure 3:
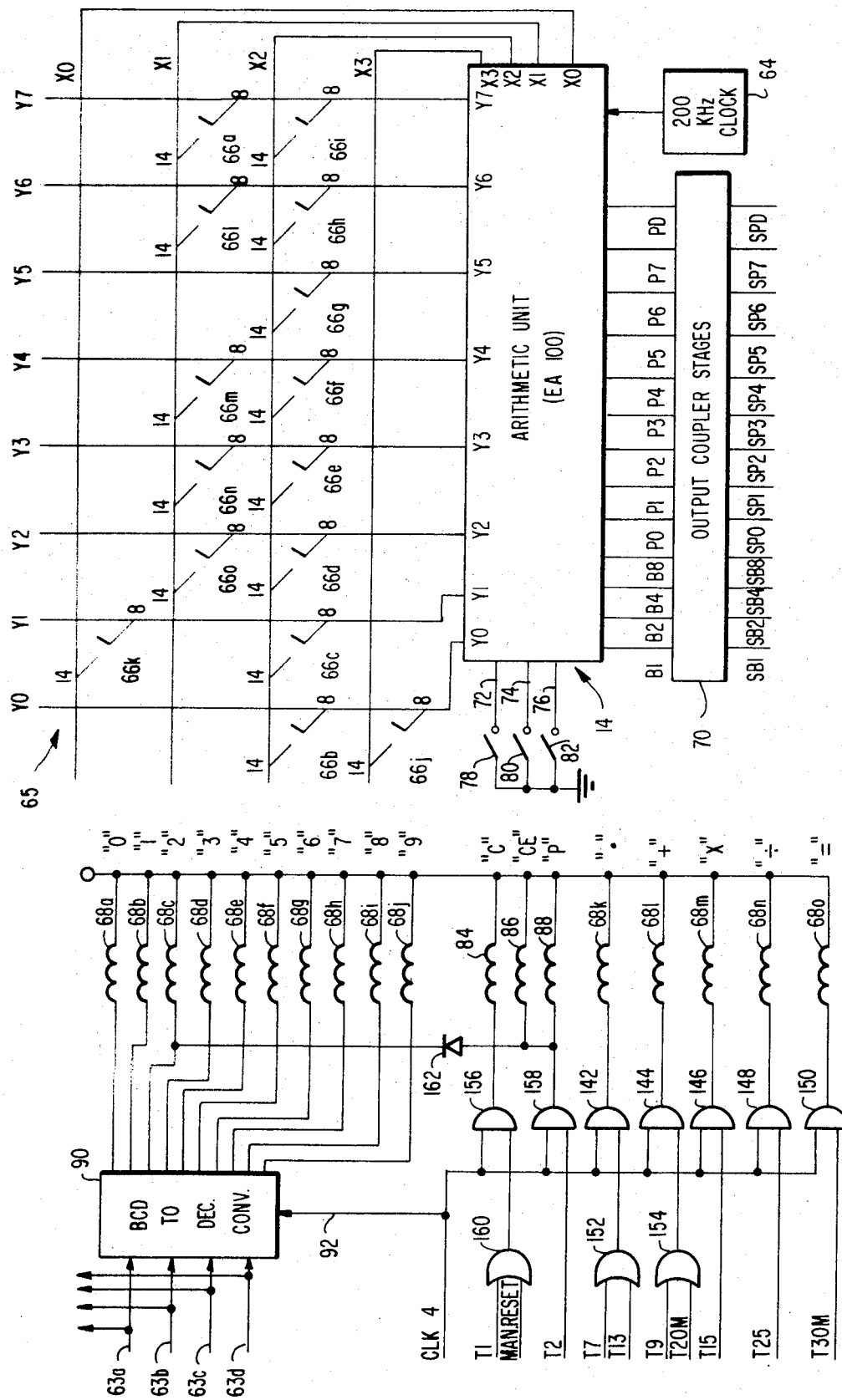
FIG. 3 is a detailed functional diagram of the arithmetic unit and associated input and external control logic.

As previously noted, the system is built around the arithmetic unit and the operating command and data input formats are dictated to a certain extent by the particular arithemtic unit employed. Referring to FIG. 3, for the EA S100, numerical inputs are accepted in a decimal format, one digit at a time beginning with the most significant digit. All data entry, read-out, and internal processing operations are controlled by a 200KHz master clock 64. Each character is entered in response to a pair of signals $X_n Y_n$ appearing at respective $X_0$ through $X_3$ and $Y_0$ through $Y_7$ inputs. Under control of clock 64, arithmetic unit 14 scans the X and Y inputs at a rapid rate by providing signals in sequence at the X inputs, and associating any Y inputs present with the X input being scanned.

This arrangement lends itself to providing input data by means of a cross-point matrix 65 having eight columns $Y_0$ through $Y_7$ and four rows $X_0$ through $X_4$. Ten numerical character cross-points are defined by a set of ten externally controlled switches 66a through 66j respectively corresponding to characters 0 through 9. In the llustrated embodiment, switches 66a through 66j are shown as contact pairs controlled by respective solenoids 68a through 68j, but it will be appreciated that a transistor matrix or the like could be used instead.

As noted above, the inputs are scanned by providing signals successively at the X inputs. Thus, actuation of one of solenoids 68a through 68j as hereinafter described causes closure of a circuit through selected X and Y inputs thereby entering a character into arithmetic unit 14.

Operating commands for addition, multiplication, division and totalizing as well as for decimal point entry are provided in the same manner as the numerical characters. Thus, five additional cross-points are defined by five switches 66k through 66o controlled by respective solenoids 68k through 68o, associated respectively wih the "decimal point entry", "add", "multiply", "divide", and "totalize (=)" respectively. Arithmetic unit 14 is also capable of a subtraction operation, but this is not required in the solution of equation 2 and thus no cross-point need be allocated for it. As in the case of numerical data, sequential actuation of the X inputs and operation of one of solenoids 68a through 68o results in closure of the circuit between selected X and Y inputs thereby entering the desired operating command.

Since data and commands are entered serially, one character at a time, there must first be entered a first operand, followed by the desired arithmetic command, and thereafter, by a second operand. However, because each operand is entered one character at a time, the previously entered operation can not occur until a succeeding operation command is entered. Otherwise the system would not know that all digits of the operand have been entered. Thus, entry of an arithmetic command by means of one of contact pairs 66l through 66n results in temporary storage of the arithmetic function and execution of this function only after entry of at least one subsequent numerical digit by means of one of contact pairs 66a through 66j followed by another arithmetic command.

Entry of the totalize command by means of contact pair 66o effectively clears the intermediate storage registers in arithmetic unit 14 and results in multiplex output presentation of the result of the previous computation in 8421 BCD form at a set of outputs labelled B1, B2, B4, B8. Also, for each BCD output pattern, there is provided an output signal on one of selection leads P0 through P7 to identify the position of the BCD digit in an eight-bit display sequence. A similar indication is provided by a PD output signal for setting a decimal point in a display.

The arithmetic unit output signals are coupled through a series of output coupler stages collectively denoted 70, the respective BCD signals being designated SB1, SB2, SB4, and SB8, the position signals being designated SP0 through SP7 and the decimal point signal being designated SPD.

Three additional input functions for arithmetic unit 14 are also provided. These are the register clear function, the clear entry function, and a decimal point set function. Actuation signals for these functions are provided to arithmetic unit 14 at respective inputs 72, 74 and 76 by means of associated switches 78, 80, and 82, controlled by respective solenoids 84, 86 and 88.

Actuation of respective ones of solenoids 68a through 68j is provided by means of a BCD to decimal converter unit 90 which receives binary coded decimal signals over leads 63a through 63d from input register unit 12 as previously described in connection with FIG. 2. BCD to decimal converter 90 may be constructed in any desirable manner. For example, there are commercially available integrated circuit units such as model No. 8251 BCD to decimal decoder manufactured by Signetics. Inc., of Sunnyvale, Calif., constructed for precisely this purpose. The input signals appearing on leads 63a through 63d may be provided through input gating circuits included in the BCD to converter 90 operating under control of a strobe signal CLK4 provided over a signal path 92 and described more fully hereinafter. Each time strobe signal CLK4 appears on lead 92, the 8421 BCD signals on input leads 62 are converted to a one-of-ten signal appearing at one of the 10 outputs connected to respective solenoids 68a through 68j.

Figure 4:
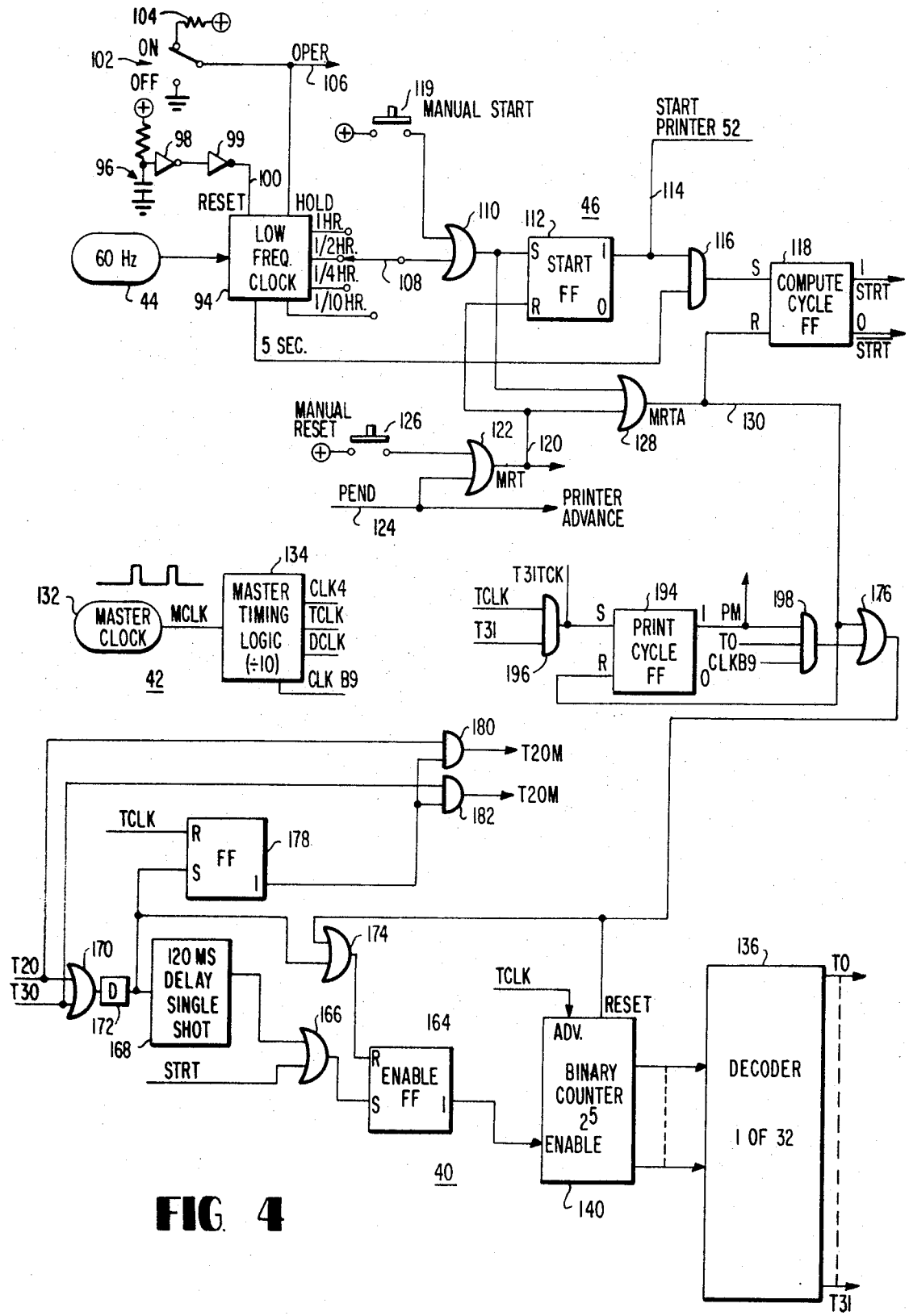
FIG. 4 is a detailed functional diagram of the program control logic for the system.

Program control for the operation of arithmetic unit 14, and for data entry through cross point matrix 65 is provided by control logic subunit 18 shown in FIG. 4. As previously mentioned in connection with FIG. 1, the control logic subunit includes 60Hz source 44, a computation interval selector 46, 6 minute clock 32, an operation sequencer 40 and an associated clock generator 42.

Operation of the computation interval selector 46 and the 6 minute clock is based on a 60 Hz reference source since the overall system power supply may be used for this purpose, obviating the need to count down the substantially higher frequency reference signals used elsewhere in the system.

The computation interval selector comprises a low frequency clock constructed in any conventional or desired manner of commercially available dividers and other logic elements to generate output pulses at 60, 30, 15, and 6 minute intervals. The 60, 30 and 15 minute interval pulses are selectively employed to initiate computation sequences as hereinafter explained. The 6 minute interval pulse advances drill time register 20 through AND gate 30 (see FIG. 2). Also, for establishing a startup delay for the printout mechanism as described below, a 5 second pulse interval is provided.

Clock 94 includes a reset input which is operative to reset all of the interval clock circuitry to a zero count state when the reset input signal is low, and power is provided to the system. The reset is used when the system is turned on, i.e., when power is applied to the system to assure that clock 94 begins its operation at a zero count.

The reset operation is accomplished by means of a circuit including a RC delay network 96 connected between the power supply and ground, and a pair of series connected inverters 98 and 99. The time constant of RC network 96 is selected to be sufficiently long that after power is applied to the system, the operation of all circuits stabilizes before the input to inverter 98 reaches a sufficiently high level for the inverter output to go low. This, of course, means that the output of inverter 99 on lead 100 remains low throughout the initial stabilizing period, and clock 94 remains reset during this time. After the capacitor in the RC network charges to a sufficient level for the output of inverter 98 to go down, the output of inverter 99 goes up, thereby freeing clock 94 to advance in response to pulses from 60 Hz clock 44.

Advance of clock 94 during actual drilling is controlled by an on/off switch 102. In the "off" position switch 102 connects a lead 106 to ground, while in the "on" position, lead 106 is coupled to the power supply through resistor 104. Lead 106 is connected to a "hold" input of clock 94 which operates a gating circuit which couples the 60 Hz input to the internal logic circuitry. Switch 102 also provides an enabling signal on lead 106 denoted OPER which conditions AND gates 30 and 34 (see FIG. 2.) Thus, unless switch 102 is in the on position, neither clock 94 nor registers 20 and 22 are permitted to advance, but rather retain their previous count. In operation, the driller turns switch 102 to the on position when drilling is taking place and turns the switch off when drilling is interrupted. (This can be done automatically, if desired.) Thus advance of drill time and footage drilled is permitted only when the drilling operation is proceeding.

Referring again to FIG. 4, the computation interval is selected by a three position switch 108 arranged to provide the 60, 30, and 15 minute interval pulses as an input to an OR gate 110. The output of OR gate 110 provides a "set" input for a start flip-flop 112, the ONE output of which is connected over lead 114 to actuate the various mechanisms of printer 52, and also to condition an AND gate 116. The other input for AND gate 116 is provided by the five second interval pulse from low frequency clock 94. Thus, five seconds after the start flip-flop is set, AND gate 116 operates. This sets a compute cycle flip-flop 118 which initiates the actual computation cycle as hereinafter described.

A second input to OR gate 110 is provided by means of a manual start switch 119 to permit independent actuation of a computation cycle other than every hour, half hour, or quarter hour.

Reset for start flip-flop 112 is provided over lead 120 by the master reset signal (MRT) generated by an OR gate 122. The latter receives as inputs PROGRAM END signal (PEND) on lead 124 and a manual reset signal from a manual reset switch 126. The MRT signal is also provided to an OR gate 128, a second input to which is provided by OR gate 110. OR gate 128 generates another reset signal (MRTA) on lead 130, which resets compute cycle flip-flop 118 thereby assuring that this flip-flop is reset at the beginning of a computation cycle.

The remaining circuitry in FIG. 4 comprises operation sequencer 40 and associated clock generator 42, the purpose of which is to initiate and control data and operation command inputs for arithmetic unit 14 and to initiate and control data printout at the end of each computation.

In connection with these functions, it should be noted that with arithmetic unit master clock 64 operating at 200 KHz, an interval of less than 16 milliseconds is required to enter a character or to perform the addition function. The maximum times for multiplication and division are 80 milliseconds and 120 milliseconds, respectively. Thus, each data entry and addition interval required for the computation is established to be approximately 16 milliseconds. For convenience of circuit design, both the multiplication and division intervals are established to be 120 milliseconds.

Considering equation 2, it may be seen that the basic operating program requires the following steps:

Enter elapsed time (four digits plus decimal point)
Enter addition command
Enter estimated trip time (four digits plus decimal point)
Enter multiplication command
Enter rig cost (four digits)
Enter addition command
Enter bit cost (four digits)
Enter division command
Enter total footage drilled (four digits)
Enter totalize command Thus, assuming a separate program interval for each digit (and decimal point) of the data entry sequence, and for each of the operating commands, it may be seen that a minimum of 27 program intervals are required for solution of equation 2.

Also, as explained below, at the beginning of each computation interval, it is necessary to clear the arithmetic unit and to set in a decimal point reference to accommodate the decimal points of the total drill time and estimated trip time. Additionally, a program interval is provided for printing out the result of the computation and finally, a program rest state is provided to prevent operation of the arithmetic unit between successive computations. A total of 31 program intervals or states is therefore required. These are provided by clock generator 42 in conjunction with operation sequencer 40.

Clock generator 42 comprises a master pulse generator 132 and a master timing logic unit 134. Clock 132 generates a pulse train comprised of a series of pulses of approximately 34 microsecond duration and a repetition period of approximately 1.65 microseconds. Clock 132 may be constructed in any desired manner, for example, using a pair of single shot multi-vibrators connected in a closed loop, with one having an operating cycle equal to the duration of the clock pulse, and the other having an operating cycle equal to the repetition period of the pulse train.

The output of clock 132 is provided as the input to master timing logic unit 134. The latter is basically a decade counter with additional associated logic circuitry to generate several pulse outputs in a particular time relationship for each operating cycle. This relationship may best be seen from FIG. 7 where waveform $a$ represents the master clock pulse train (MCLK) and where waveforms $b$ through $e$ represent the so-called CLK4, DCLK, TCLK, and CLKB9, waveforms respectively.

Waveform $a$ shows 10 MCLK pulses representing one operating cycle of master timing logic unit 134. The CLK4 waveform shown in line $b$ of FIG. 7 commences with the trailing edge of the fourth MCLK pulse and terminates on the trailing edge of the eighth MCLK pulse. As previously mentioned, this signal establishes the multiplex readout interval for registers 20 through 28 by conditioning AND gates 61a through 61d.

The DCLK waveform shown in line $c$ of FIG. 7 comprises four pulses synchronous with the fifth through eighth MCLK pulses in each cycle. These pulses serve to operate a data output shift register hereinafter described, during the printout operation.

The TCLK waveform shown at line $d$ of FIG. 7 is a single pulse appearing synchronously with the ninth MCLK pulse in each operating cycle, i.e., every 16.5 milliseconds (approximately). Primarily, the TCLK pulse serves to advance operation sequencer 40 from one program state to the next, and operates a printout program sequencer, all described more fully below.

Finally, the CLKB9 waveform represented by line $e$ of FIG. 7 is a single pulse appearing synchronously with the tenth MCLK pulse in each cycle. The clock B9 pulse may be regarded as a delayed version of the TCLK pulse, and serves certain reset functions in connection with operation sequencer 40 as well as certain program advance functions in connection with the printout operation sequencer, all discussed more fully hereinafter.

With specific regard to operation sequencer 40, it will be recalled that 31 separate program states are required for computation of a solution to equation 2.

The program states are represented by signal outputs $T_0 - T_{31}$ provided by a one-of-thirty-two decoder unit 136. The selected state is identified for example, by a high signal at one only of the 32 outputs with the remaining 31 outputs being low (or vice versa). Operation of decoder 136 is controlled by a binary signal pattern provided over five leads 138a through 138e from a $2^5$ binary counter unit 140.

Decoder unit 136 and counter 140 are constructed in any conventional or desired fashion but preferably comprise commercially available integrated circuit logic elements. By way of example, decoder unit 136 may be constructed of a pair of Fairchild 9311 one-of-sixteen decoders while counter unit 140 may be constructed of a Fairchild model 9316 four bit binary counter and a Fairchild model 9000 JK flip-flop, connected together to form a $2^5$ counter in a manner which will be understood by one skilled in the art.

From a logical standpoint, counter unit 140 includes advance, reset, and enable inputs, the advance input being operative in the presence of an enable input to cycle the counter through its 32 binary states. The presence of a reset input returns counter 140 to the zero state, irrespective of the other inputs.

The advance input is provided by the TCLK signal previously mentioned, with the counter responding to the trailing edge of the advance pulse to effect a stage change. As mentioned above, the TCLK pulse occurs once for every 10 master clock pulses at a repetition period of approximately 16.5 milliseconds. Thus, as long as the ENABLE signal is present, binary counter 140 advances from one binary state to the next at approximately 16 millisecond intervals and the program state represented by the "T" outputs of decoder 136 advances at the same rate.

As counter 140 advances through its operating cycle, the various operations controlled by program states $T_0$ through $T_{31}$ are performed. Table 1 below sets forth the operations associated with each program state.

| Program State | Operation |
|---|---|
| $T_0$ | Program Rest State |
| $T_1$ | Clear Arithmetic Unit |
| $T_2$ | Clear Arithmetic Unit Entry Register, set decimal point for two decimal digits |
| $T_3$ | Spare — no program function |
| $T_4$ | Enter elapsed time — hundreds digit |
| $T_5$ | Enter elapsed time — tens digit |
| $T_6$ | Enter elapsed time — units digit |
| $T_7$ | Enter elapsed time — decimal point |
| $T_8$ | Enter elapsed time — one tenth (0.1) digit |
| $T_9$ | Enter addition command |
| $T_{10}$ | Enter trip time — hundreds digit |
| $T_{11}$ | Enter trip time — tens digit |
| $T_{12}$ | Enter trip time — units digit |
| $T_{13}$ | Enter trip time — decimal point |
| $T_{14}$ | Enter trip time — one tenth digit |
| $T_{15}$ | Enter multiply command |
| $T_{16}$ | Enter rig cost — thousands digit |
| $T_{17}$ | Enter rig cost — hundreds digit |
| $T_{18}$ | Enter rig cost — tens digit |
| $T_{19}$ | Enter rig cost — unit digit |
| $T_{20M}$ | Enter addition command |
| $T_{21}$ | Enter bit cost — thousands digit |
| $T_{22}$ | Enter bit cost — hundreds digit |
| $T_{23}$ | Enter bit cost — tens digit |
| $T_{24}$ | Enter bit cost — unit digit |
| $T_{25}$ | Enter divide command |
| $T_{26}$ | Enter footage drilled — thousands digit |
| $T_{27}$ | Enter footage drilled — hundreds digit |
| $T_{28}$ | Enter footage drilled — tens digit |
| $T_{29}$ | Enter footage drilled — unit digit |
| $T_{30M}$ | Enter totalize (=) command |
| $T_{31}$ | Initiate printout sequence |

Several points should be noted concerning Table 1. First, the $T_0$ state is designated as a rest state. This is the state in which decoder 136 is maintained when a computation is not in progress. The zero state is reached when binary counter unit 140 advances from a count of 31 in response to the next TCLK pulse. Another point to be noted is that the computation sequence described above requires only 31 program states including the rest state and the printout sequence state. Thus with the 32 state decoder, a spare state exists. This is chosen to be $T_3$.

Further, it will be recalled that because of the sequential nature of the data entry process for arithmetic unit 14, an arithmetic command is not executed until the following arithmetic command is entered. Thus, referring to the Table, while the first addition command is entered at program state $T_9$, the actual addition operation does not take place until time $T_{15}$. Similarly, the multiplication entered at program state $T_{15}$ does not take place until program state $T_{20}$, and the division command entered at program state $T_{25}$ does not take place until time $T_{30}$.

The time required to execute the multiplication and division operations is substantially greater than for data entry and addition operations. However, the data entry during program intervals $T_{20}$ and $T_{30}$ require only the regular 16.5 milliseconds. Thus, as explained below, the command entry intervals which pertain respectively to the "enter addition" command and "enter totalize" command associated with program states $T_{20}$ and $T_{30}$ are of 16.5 millisecond duration but the beginning of the $T_{21}$ and $T_{31}$ program intervals are delayed to permit arithmetic operations of multiplication and division to be executed. The $T_{20}$ and $T_{30}$ command entry intervals are designated $T_{20M}$ and $T_{30M}$, respectively.

Establishment of both the modified program intervals $T_{20M}$ and $T_{30M}$, and the actual computation intervals $T_{20}$ and $T_{30}$ is accomplished by means of the enable control circuitry for binary counter 140 described below.

Referring again to FIG. 2, it will be recalled that scanning of the stages of register subunit 12 is accomplished by various ones of the $\overline{T}$ signals. These signals may be provided by the outputs of decoder 136 coupled through respective inverters. In practice, however, the Fairchild 9311 decoders preferred for construction of decoder unit 136 provide outputs in negative form, i.e., a low level for the particular state selected, and high levels for all of the unselected states. These signals are used directly to scan the register stages.

The operation commands associated with the program states indicated in Table 1 above are also provided directly by the outputs of decoder unit 136. Specifically, solenoids 68k through 68o are coupled to respective AND gates 142, 144, 146, 148 and 150, enabling inputs for which are provided by the CLK4 signal from master timing logic unit 134. The conditioning input for AND gate 142 is provided by an OR gate 152, the latter receiving as its input, the T7 and T13 signals from decoder 136. Referring to Table 1, it may be seen that these signals represent the entry commands for the decimal points associated with the total drill time and estimated trip time, respectively.

The conditioning input for AND gate 144 is provided by an OR gate 154 which receives as its inputs, the T9 and T20M signals respectively. From Table 1, it may be seen that these correspond to the entry of the addition operation command.

Similarly, the conditioning inputs for AND gates 146, 148 and 150 are provided respectively by the T15, T25, and T30M signals. From Table 1, it may be seen that these correspond to the entry commands for the multiplication, division, and totalizing operations.

The initial condition setting operations which take place during program intervals T1 and T2 are provided by a pair of AND gates 156 and 158, both of which are conditioned by the CLK4 signal from master timing logic unit 134 as in the case of AND gates 142 through 150, AND gate 156 receives its control input from an OR gate 160 which in turn receives both the T1 program state signal and a manual reset signal from switch 126 (see FIG. 4.) Actuation of AND gate 156 operates solenoid 84 and associated switch 78 to provide the "clear" instruction for arithmetic unit 14.

The control input for AND gate 158 is provided by the T2 program state signal. Actuation of AND gate 158 operates solenoids 86 and 88 and associated switches 80 and 82 to provide the clear entry and decimal point set commands for arithmetic unit 14. AND gate 158 also actuates solenoid 68c through diode 162 to close cross-point 66c. As previously explained, this generates the numerical input 2 for arithmetic unit 14. In conjunction with the decimal point set input by means of switch 82, the output format for the arithmetic unit, i.e. two decimal places, is established in this manner.

Returning now to FIG. 4, generation of the extended T20 and T30 program intervals, and the normal length T20M and T30M intervals will now be described.

The enable input for binary counter unit 140 is provided by the ONE output of an enable flip-flop 164, the set input for which is provided by an OR gate 166. The first input for OR gate 166 is provided by the START signal from compute cycle flip-flop 118. The second input is provided by the output of 120 millisecond delay signal shot multivibrator 168 arranged to provide a brief output pulse 120 milliseconds after triggering. Single shot 168 is triggered by the output of an OR gate 170 through a delay circuit 172. The inputs for OR gate 170 are provided by the T20 and T30 program state signals.

The reset input for enable flip-flop 164 is provided by the output of an OR gate 174 which receives as its inputs, the single shot trigger signal from delay circuit 172, and the output of a further OR gate 176 to be described shortly.

The purpose of enable flip-flop 164 and single shot 168 is to establish the duration of the T20 and T30 intervals. As previously explained, these are the intervals during which the multiplication and division operations actually take place and are lengthened from the normal 16.5 milliseconds to approximately 120 milliseconds. Thus, at the beginning of either the T20 or T30 interval, OR gate 170 and delay circuit 172 operate to provide a reset signal for enable flip-flop 164 through OR gate 174. With enable flip-flop 164 reset, binary counter unit 140 is disabled and does not respond to further TCLK pulses until the enable flip-flop is again placed in a set state.

At the same time that enable flip-flop 164 is reset, single shot 168 is triggered to begin the 120 millisecond delay interval. At the end of this time, an output pulse is provided through OR gate 166 to the set input of enable flip-flop 164. This, in turn, re-enables binary counter unit 140 so that the next TCLK signal will advance decoder unit 136 either to the T21 or T31 state.

The command entry operations which occur during program intervals T20 and T30 do not require the extended time interval required for the division and multiplication operations, as previously noted. The required command entry signals T20M and T30M are generated by an interval flip-flop 178 which receives as its set input from the output of delay circuit 172 and as its reset input, the TCLK signal from master timing logic unit 134. The ONE output of flip-flop 178 provides a control input for a pair of AND gate 180 and 182 which respectively receive as second inputs, the T20 and T30 signals. AND gate 178 is triggered just after the beginning of the T20 and T30 intervals by the output of delay circuit 172 which conditions AND gates 180 and 182, one of which operates, depending on which one of the T20 or T30 signals is present. Upon arrival of the next TCLK pulse (approximately 16.5 milliseconds after the beginning of the T20 or T30 interval), flip-flop 178 is reset and AND gates 180 and 182 are disabled. Thus, the T20M and T30M signals are of essentially the same duration as the other program intervals (except for the extended T20 and T30 intervals.)

The printout state T31 differs from the previously described program states in that operation of the arithmetic unit has been completed and is only required to provide the result of the computation in the 8421 BCD multiplex output format as previously described. During T31, the multiplexed data from the arithmetic unit is temporarily stored in a static format compatible with that of the printer being employed. Thereafter, a printout program is executed during which data printout actually occurs.

One suitable mechanism for temporary storage of the computation employs a shift register in which the output of arithmetic unit 14 is stored in the desired sequence for printout.

Thereafter, the data stored in the shift register is provided to the printer one character at a time, at a rate suitable for the operating speed capability of the printer. Also, during the T31 interval, the shift register stores the footage drilled data from input register 22 for printout together with the results of the computation.

Figure 5:
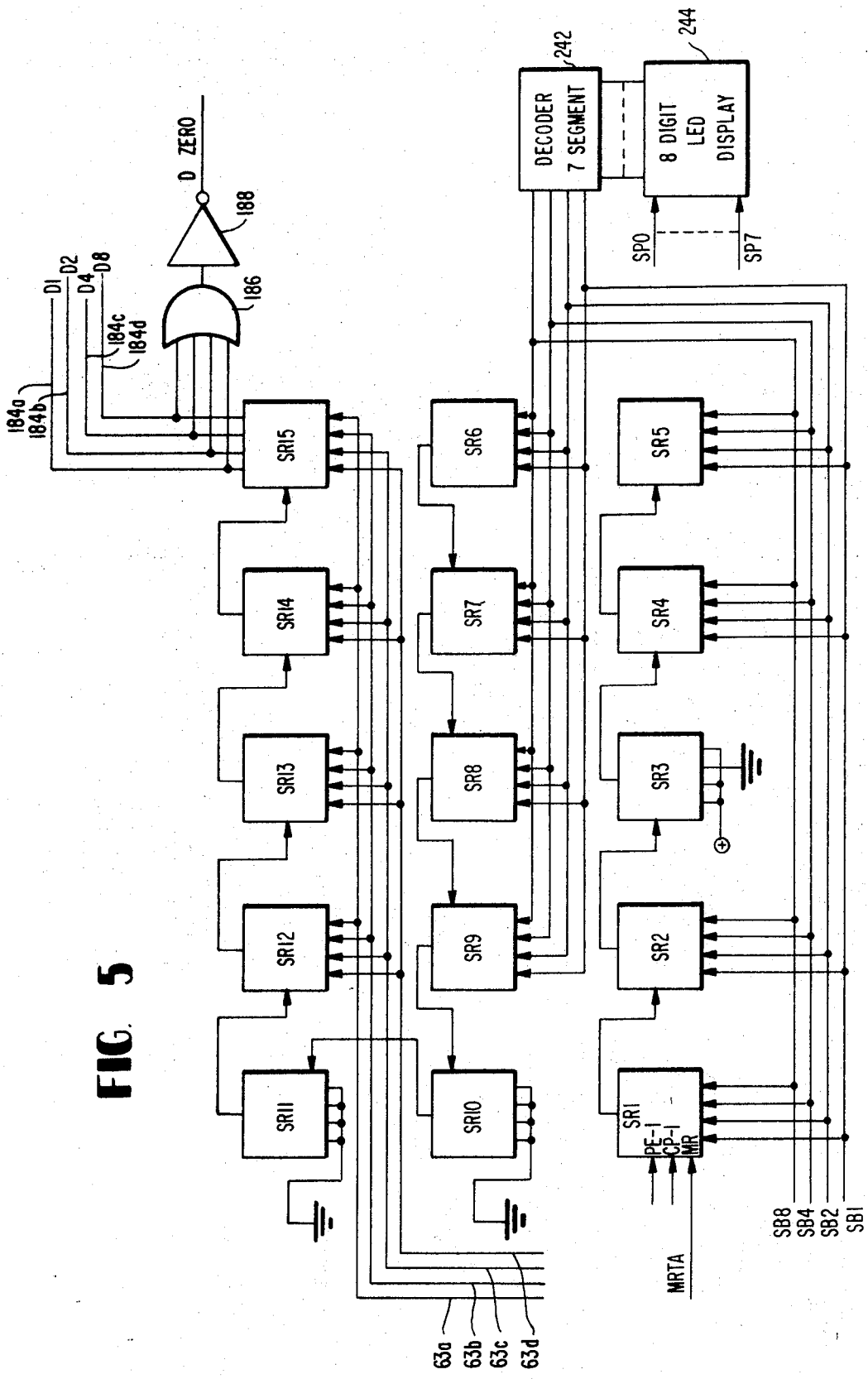
FIG. 5 is a functional and organizational diagram of the output logic for the arithmetic unit.

FIG. 5 shows one suitable shift register arrangement including 15 four-bit shift register units such as Fairchild model 9300. For convenient description and illustration, the individual stages are designated SR1 through 15. Shift register stages SR1 – 15 include three control inputs, i.e., parallel entry inputs designated P.E. 1 through P.E. 15, clock inputs designated $C_p1$ through $C_p15$ and master reset inputs designated MR. Each of shift register SR1 through 15 also has four parallel data entry inputs by which all of the four bit-positions are set if both the P.E. and $C_p$ inputs are simultaneously present. Shift register stages SR1 through SR14 each provide a serial output from the respective fourth bit position to a serial input of the succeeding stage while shift register stage SR15 provides its outputs in parallel form designated D1, D2, D4, D8 over respective output leads 184a through 184d. The latter are also connected to a four input OR gate 186 which provides a D ZERO signal output through an inverter 188. The purpose of the latter is to indicate that the output of shift register stage SR15 is zero. Thus, if all of the inputs to OR gate 186 are low, the output of inverter 188 is high. However, if any of the inputs to OR gate 186 are high, the OR gate will operate and the output of inverter 188 will be low. The D ZERO signal is employed to control suppression logic for the printer as described below.

The parallel inputs for shift register stages SR1, SR2, and SR4 through 9 are provided by the SB1, SB2, SB4, and SB8 signals from arithmetic unit output coupler stages 70 (see FIG. 3.) The parallel input for shift register stage SR3 is hardwired as indicated in FIG. 5 to represent the decimal point character code word. The parallel input for shift register stages SR10 and SR11 are also hardwired to provide zero inputs; these represent spaces in the printout format as hereinafter explained. Finally, the parallel inputs for shift register stages SR12 through SR15 are provided over leads 63a through 63d from input register subunit 12 (see FIG. 2) to provide the footage drilled reference for inclusion in the printout.

Figure 6:
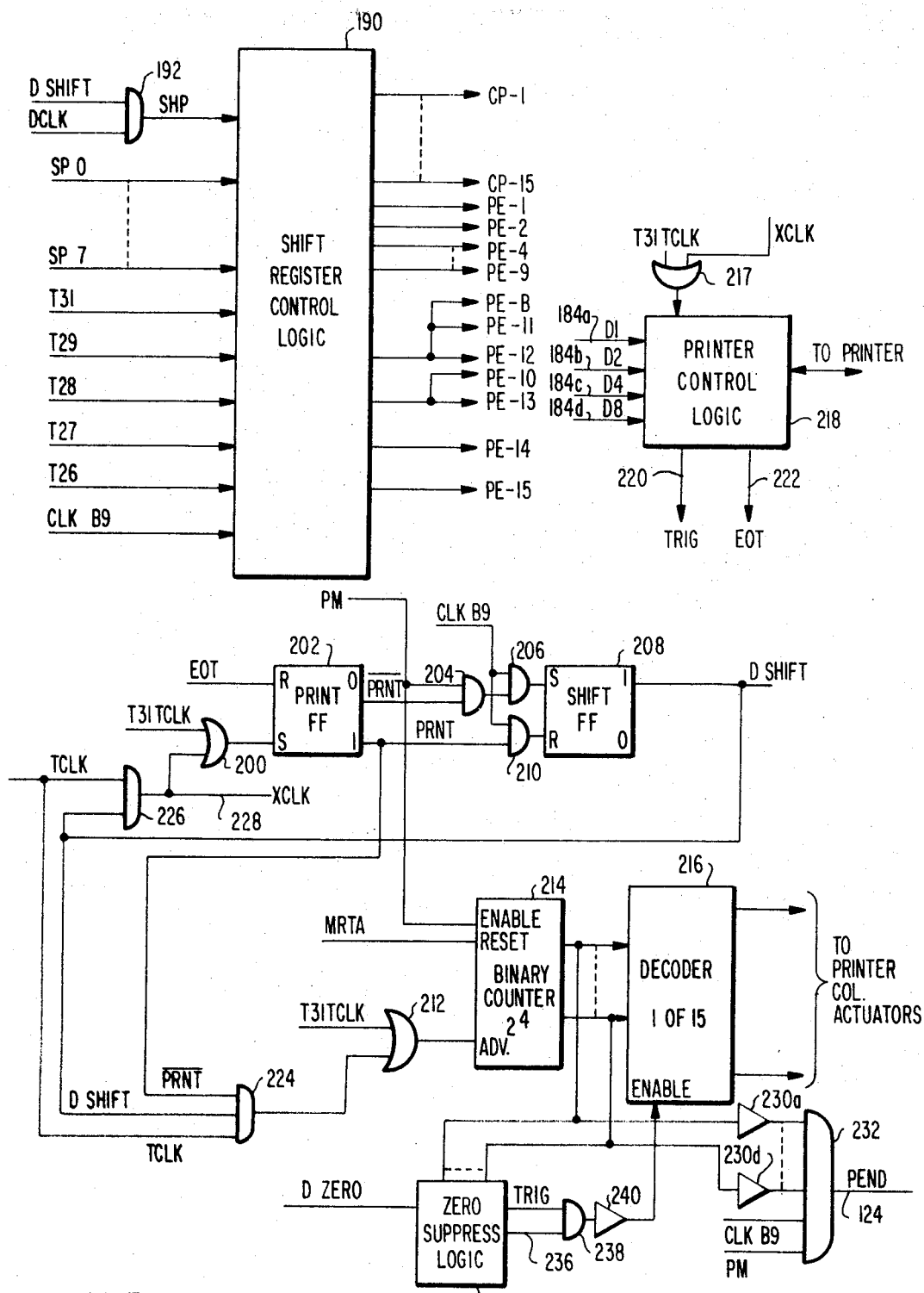
FIG. 6 is a detailed functional diagram of the printout control logic.
Figure 7:
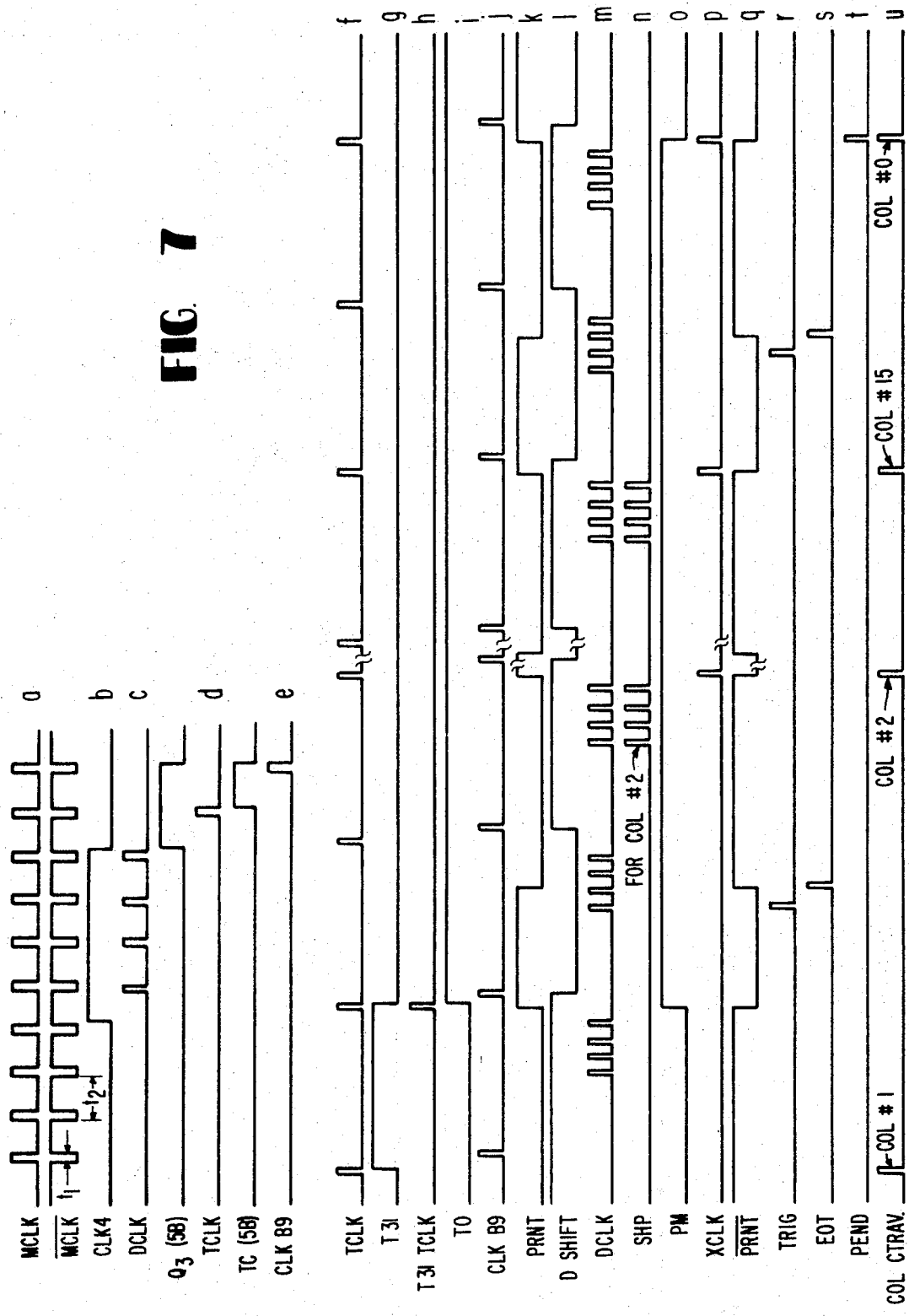
FIG. 7 is a representation of various waveforms appearing in the system, and indication of certain aspects of system operation.

Control of data entry and transfer to shift register stages SR1 through 15 is provided by shift register control logic unit 190 illustrated in FIG. 6. Shift register control logic unit 190 is comprised of a series of AND or OR gates arranged in such a manner as to produce the required $C_P$ and P.E. control signals for the shift register stages. For this purpose, there are provided as inputs, a shift pulse signal SHP by means of an AND gate 192. The latter receives as its inputs, the DCLK signals from master timing logic unit 134 (see FIG. 4) and also a D SHIFT signal generated in the manner hereinafter described by the printout control logic.

Shift register control logic unit 190 also receives as inputs the SP0 through SP7 data position signals from arithmetic unit output coupler stages 70, the T26 through T29 and T31 program interval signals from decoder 136 (see FIG. 4) and the CLKB9 signal from master timing logic unit 134.

Suitable construction of logic unit 190 will be apparent from the logic equations characterizing its operation. For convenience, therefore, Table 2 below lists the outputs P.E.1 through P.E.15 and $C_p1$ through $C_p15$ of shift register control logic unit 190.

| P.E.1 through P.E.15 | $C_p1$ through $C_p15$ |
|---|---|
| P.E.1=SP0·T31 | $C_p1$=SHP+P.E.1 |
| P.E.2=SP1·T31 | $C_p2$=SHP+P.E.2 |
| P.E.3=T29 | $C_p3$=SHP+CLK B9·T29 |
| P.E.4=SP2·T31 | $C_p4$=SHP+P.E.4 |
| P.E.5=SP3·T31 | $C_p5$=SHP+P.E.5 |
| P.E.6=SP4·T31 | $C_p6$=SHP+P.E.6 |
| P.E.7=SP5·T31 | $C_p7$=SHP+P.E.7 |
| P.E.8=SP6·T31 | $C_p8$=SHP+P.E.8 |
| P.E.9=SP7·T31 | $C_p9$=SHP+P.E.9 |
| P.E.10=T28 | $C_p10$=SHP+T28·CLK B9 |
| P.E.11=T29 | $C_p11$=SHP+T29·CLK B9 |
| P.E.12=T29 | $C_p12$=SHP+T29·CLK B9 |
| P.E.13=T28 | $C_p13$=SHP+T28·CLK B9 |
| P.E.14=T27 | $C_p14$=SHP+T27·CLK B9 |
| P.E.15=T26 | $C_p15$=SHP+T26·CLK B9 |

As mentioned above, parallel entry of data into one of the shift register stages requires simultaneous presence of the $C_P$ and P.E. signals. Thus, the logic expressions for the $C_P$ inputs inlude a term reflecting the simultaneous presence of the respective P.E. inputs.

Referring for example to the expression for P.E.1, it may be seen that parallel entry to shift register stage SR1 occurs during program interval T31 when the digit place signal SP0 from arithmetic unit output coupler stages 70 is present (which indicate that the BCD data appearing at the SP1, SP2, SP4 and SP8 outputs corresponds to the first time frame in the output multiplex cycle.) This is the most significant digit in the computation result. During the SP0 time frames occuring during program interval T31, the associated digital data is entered into shift register stage SR1. Similarly, shift register stages SR2, and SR4 through SR9 are activated during the respective SP1 through SP7 time frames occuring during the T31 program interval to store the data corresponding to the second through eighth character positions of the computation output.

Shift register stage SR3 does not store part of the computation, but rather the decimal point which comprises part of the output display. The parallel entry input for shift register stage SR3 may therefore be activated at any time; the time chosen is during the T29 program interval at the time of the CLK B9 pulse.

Shift register stages SR10 and SR11 are both arranged to store all zeros as mentioned above. Because of the programming of the zero suppression logic, zeros in these positions are suppressed, i.e., a space is "printed". This separates the characters comprising the computation characters. The parallel entry of the zero data in shift register stages SR10 and SR11 occurs during the CLKB9 pulse of the T28 and T29 program intervals respectively as indicated by the P.E.10 and 11 and $C_p10$ and 11 logic expressions in Table 2.

The reference data for the footage drilled portion of the printout is obtained directly from input register subunit 22 as previously mentioned. Since the data output of the input register subunit appears on leads 63a through 63d on a time multiplexed basis, shift register stages SR12 through SR15 are activated only during the appropriate time frames to receive the footage drilled data.

Referring to Table 1, it may be seen that the time frames for the four digits of the footage drilled data are defined by program intervals T26 through T29 with the most significant (thousands) digit being defined interval T26. As in the case of decimal point and zero digit data stored in shift register stages 3, 10 and 11, shift register stages SR12 through 15 are actuated in response to the CLKB9 pulses occuring during the respective T intervals. Thus, during program interval T26, shift register stage SR15 is loaded, during interval T27, SR14 is loaded, etc.

Briefly stated, printout is accomplished by sequentially shifting the contents of each shift register stage one stage downstream and actuating the printer, one character at a time based on the data then appearing in the shift register stage SR15. The logic control circuitry for this operation is shown in FIGS. 4 and 6 in conjunction with waveforms f through u in FIG. 7.

Referring first to FIG. 4, the printout operation is initiated at the end of program interval T31 by a print cycle flip-flop 194. The latter is set by an AND gate 196 which receives as its inputs, the TCLK signal from master timing logic unit 134, and the T31 output of decoder unit 136. As previously explained, and as illustrated in lines f and g of FIG. 7, the T31 program interval begins at the trailing edge of its associated TCLK pulse. Therefore, AND gate 196 cannot be activated until the next TCLK pulse, i.e., the one at the end of the T31 program interval. This is illustrated in line h of FIG. 7.

The latter TCLK pulse advances binary counter 140 and decoder 136 from the T31 state to the T0 state, as shown in line i of FIG. 7, which conditions an AND gate 198, and also operates AND gate 196. This generates a T31 TCLK pulse which sets print cycle flip-flop 194. The resulting PM signal at the ONE output further conditions AND gate 198. Then, the immediately following CLKB9 pulse (see line k of FIG. 7) activates AND gate 198 and provides the reset signal for both binary counter 140 and its associated enable flip-flop 164. With enable flip-flop reset, counter 140 is prevented from advancing in response to further TCLK pulses and thus decoder 136 is maintained in the $T_0$ or rest state for the remainder of the operating cycle.

The PM and T31TCLK signals are also provided to the circuitry shown in FIG. 6. In particular, the T31TCLK signal is provided as one input to an OR gate 200 which is connected to the set input of a print control flip-flop 202. The ZERO output of flip-flop 202 designated $\overline{PRNT}$ provides a conditioning input for an AND gate 204 which in turn provides the conditioning input for a further AND gate 206. The latter is connected to the set input of a data shift flip-flop 208, the ONE output of which provides the D SHIFT signal. The reset input for flip-flop 208 is provided by an AND gate 210 connected to the ONE output of print control flip-flop 202, designated PRNT. AND gates 206 and 210 receive as control inputs, the CLKB9 signal from master timing logic unit 134 (see FIG. 4.)

As mentioned above, the T31TCLK signal sets print control flip-flop 202 which enables AND gate 210 and disables AND gate 206. Thus, the next CLKB9 signal resets shift control flip-flop 208, maintaining the D SHIFT signal at a low level.

The T31TCLK signal is also provided as one input to an OR gate 212 which is connected to the advance input of a four-bit binary counter 214, preferably a Fairchild No. 9316 or the equivalent. Counter 214 receives as its enable input, the PM signal from print cycle flip-flop 194 (see FIG. 4.) Since both the PM and T31TCLK signals are simultaneously present, counter 214 is advanced from its zero state (having been reset to that state by the MRTA signal at the beginning of the computation being printed out by OR gate 128 in FIG. 4) to a count of one. The resulting four-bit binary representation is provided to a one of fifteen decoder 216 such as a Fairchild No. 3911 (with one output state unused) which selectively activates one of 15 output lines for controlling the printer.

As previously mentioned, the printer operates by selectively engaging laterally spaced print hammers with characters positioned in peripheral rows around a rotating printer drum. Presence of a column signal does not actually operate the print hammer, but rather conditions the print hammer control logic so that when the print drum is properly positioned to print out the desired character, the print hammer is actuated.

The T31TCLK signal also actuates a printer control logic unit 218 through an OR gate 217. The details of the construction of the latter are not per se part of the present invention, and in actuality are dictated directly by the construction of the printer. In the interest of simplicity of illustration and description, the details of logic unit 218 are not presented.

Briefly, however, rotation of the printer drum generates a sequence of binary coded decimal reference signals indicating the drum position. The latter signals are compared with the D1, D2, D4, and D8 signals on leads 184a – d representing the character to be printed. When the printer drum reference signals match the respective D1, D2, D4 and D8 signals, the print hammer selected by the column actuation signals from decoder 216 operates and the desired character is printed. Operation of the print hammer is indicated by the appearance of a trigger signal (TRIG) appearing on lead 220 followed at the end of the print operation by an "end of trigger" (EOT) signal on lead 222.

Since the T31TCLK signal causes the column 1 output of decoder 216 to be selected and also triggers printer control logic unit 218, the printer immediately begins to compare the position of the rotating print drum with the data provided by shift register stage SR15 — i.e. the thousands digit of the footage drilled reference provided by input register stage 22. When coincidence is achieved, the trigger signal is generated, and the character is printed. Thereafter, the EOT signal is generated.

In connection with the foregoing, it will be understood that the angular position of the printer drum at the time of the T31TCLK signal determines how quickly the printer drum reaches the position necessary to print the desired character. For the Suwa Seiko printer EP101 previously mentioned, a revolution of the printer drum requires about 288 milliseconds; this represents the maximum possible time between the T31TCLK signal and the trigger signal. During this interval, binary counter 214 is not advanced since the T31TCLK signal is not repeated, and the other advance input for counter 214 provided through OR gate 212 is generated by an AND gate 224 which receives as its inputs, the PRNT signal from print control flip-flop 202 and also the D SHIFT signal from shift control flip-flop 208. The latter is zero at this time since shift control flip-flop 208 is reset and thus, successive TCLK signals do not operate AND gate 224 to advance counter 214.

When the print operation for the first column has been completed, the EOT signal resets print control flip-flop 202. This disables AND gate 210, and conditions AND gate 206 through AND gate 204. Thus, the next CLKB9 signal sets shift control flip-flop 208 which causes the D SHIFT signal to go to high. This is shown by waveform l of FIG. 7. [The immediately previous TCLK signal does not advance counter 214 since the D SHIFT signal was still low at that time.]

With the D SHIFT signal now high, AND gate 192 is conditioned so that the next DCLK pulses (see line m of FIG. 7) generate four SHP pulses which are provided to shift register control logic unit 190. These are shown at line n of FIG. 7.

Referring to Table 2 above, it may be seen that all of shift register stages SR1 through 15 advance serially in response to the four SHP pulses. Thus, the data previously contained in shift register stage SR14 is advanced into shift register stage SR15. Similarly, all of the data stored in shift register stages SR1 through SR13 is likewise advanced to the next stage.

Comparing lines f and m of FIG. 7, it may be seen that shortly after the last of the four DCLK pulses, a TCLK pulse appears. This is provided to AND gate 224 which is conditioned by the PRNT and D SHIFT signals and provides a pulse through OR gate 212 to advance binary counter 214 from the "one" state to the "two" state. This advances decoder 216 to activate the column 2 output.

At the same time, the TCLK signal is provided as one input to an AND gate 226 which receives as its second input, the D SHIFT signal from shift control flip-flop 208. With the D SHIFT signal high, the TCLK signal causes AND gate 226 to operate producing the XCLK signal on lead 228. This signal is provided through OR gate 200 to reset print control flip-flop 202, and through OR gate 217 to actuate printer control logic unit 218. The latter operates in precisely the same manner as described above for actuation by the T31TCLK pulse and thus effects printout in the second column position, the data represented by the outputs of shift register stage SR15. At this time, of course, the data appearing there is the hundreds digit of the footage drilled information.

Comparing lines f and j of FIG. 7, it may be seen that a CLKB9 signal immediately follows the TCLK signal by which the XCLK signal was generated. The CLKB9 signal is provided to AND gates 206 and 210, but with print control flip-flop 202 reset AND gate 206 is disabled. However, AND gate 210 is conditioned by the PRNT signal and the arrival of the CLKB9 pulse causes shift control flip-flop 208 to be reset. The D SHIFT signal therefore goes low and disables AND gate 192 so that the next sequence of DCLK pulses does not affect shift register control logic unit 190. The low level of the D SHIFT signal also disables AND gate 226 preventing the next TCLK signal from generating an XCLK signal, and also disables AND gate 224 so that the next TCLK signal does not generate an XCLK signal or advance binary counter 214. The reason for this is to arrest the printout program during the maximum 288 milliseconds required for the printer drum to reach the required position to print out the character then being processed.

As soon as the second character has been printed, the EOT signal is generated on lead 222 by the printer control logic unit and print control flip-flop 202 is again reset. The system then repeats operation as previously described for each of the remaining characters with successive shifting of four bits into the 15th stage of the shift register followed by printout and retriggering of the print control flip-flop by the EOT signal.

After the data for the 15th column has been shifted into shift register stage SR15 in response to the associated DCLK pulses, the next TCLK pulse advances counter 214 to the 15th state which in turn activates the column 15 output of decoder 216. The XCLK pulse generated at that same time activates printer control logic unit 218 and effects printing of the final character. Thereafter, the EOT signal resets print control flip-flop 202. This conditions AND gate 206 and the succeeding CLKB9 pulse sets shift control flip-flop 208. Since the D SHIFT signal then goes high, the next group of DCLK pulses advances the shift register once again but there is at that time no further data to be printed out.

The TCLK pulse following the last mentioned four DCLK pulses generates an additional XCLK pulse and also advances counter 214 to the zero position. The counter outputs which are all now zero are connected through respective inverters 230a through 230d, the outputs of which are in turn connected to four inputs of a six input AND gate 232. The latter receives as additional inputs, the PM signal and the CLKB9 pulse.

Thus, when counter 214 reaches the zero state, the immediately following CLKB9 pulse completes the conditioning for AND gate 232 which operates to generate the program end (PEND) signal on lead 124 previously described. This indicates the end of the computation cycle and by means of OR gates 122 and 128, produces the MRTA signal on lead 130 to reset print cycle flip-flop 194. The system then comes to rest awaiting the next cycle start pulse from computation interval selector switch 108. (See FIG. 4.)

Referring back to FIG. 6, as previously mentioned, the system includes means for suppressing zeros in the printout, both to provide a demarcation between the footage drilled date and the computation of cost per foot, and also to simplify visual inspection of the result. Zero suppression operation may best be understood by considering that the printout consists of 15 places the first four of which can contain numbers (corresponding to a maximum of four digits for the footage drilled display), the next two places of which are blank (spaces), the next six places of which can be up to six digits of the cost per foot display, the next place of which is a decimal point, and the last two places of which are two decimal digits. For zero suppression, it will be understood that to define the blanks in the fifth and sixth place zero suppression is always required. For the first four digits, zeros are to be suppressed moving to the left only until a non-zero digit is encountered. Thus, if the footage drilled to be printed out is 909 feet the zero in the thousands place is suppressed but the zero in the tens place is not suppressed.

Zero suppression also may take place moving to the right from the seventh position until a non-zero digit is encountered, after which zero suppression is not permitted.

By way of example, therefore, if the total footage drilled is 920 feet and the cost per foot is $5.75 at that depth, then the resulting printout would be:

_ 920 _ _ _ _ _ _ _ _ 5.75.

Zero suppression in accordance with the foregoing requirements is provided by a zero suppression logic circuit 234 constructed in any suitable manner to meet the above stated requirements. Inputs include the four binary signals produced by the output of counter 214 indicating the particular position in the printout sequence, and the D ZERO signal from shift register stage SR15 (see FIG. 5.) If the D ZERO signal appears during any one of the intervals in which a zero may be suppressed, an output will be provided on lead 236 to condition an AND gate 238. When the TRIGGER signal is generated by printer control logic unit 218 indicating that the print drum is in a proper position to print a zero, AND gate 238 operates to produce a signal which is inverted by an inverter 240. The output of the latter is provided to the enable input of decoder 216 momentarily turning off the decoder and preventing the print hammer for the column in question from being actuated. In this way, the printer does not operate when a zero is to be printed and the column in question is, in effect, skipped.

Finally, with reference to FIG. 5 an additional display mechanism is illustrated. Here, the binary code decimal signals from arithmetic unit output coupler stages 70 are provided to a seven-segment decoder 242 which actuates an eight-digit light emitting diode display 244. The particular one of the eight digits to be actuated is selected by activation of one of the SP0 through SP7 signals from output coupler 70. The operation of decoder 242 and display 244 is conventional, and further detail is not believed necessary.

In the foregoing there has been described a new and advantageous means of providing convenient indication to the driller of the cost per foot of the hole being drilled. Simply by observing the result of successive computations, it is immediately apparent to the driller when the average cost per foot begins to increase. From this information the driller may easily determine whether to replace a bit (either due to wear or passage through a formation for which the bit is not suited) or to continue using the bit (in anticipation of rapid passage through a particular formation or to facilitate scheduling of other operations, even if the bit is worn.)

The system is reliable and easy to use since the operator need only set up the values of rig cost and bit cost and his estimate of the approximate trip time which will be required to change a bit when it is worn. The latter number will change as the hole gets deeper, although not in a direct linear relationship to the depth of the hole. Thus, when a bit is changed, the operator inserts in register 28 his estimate of the trip time which will be required when the new bit has worn. This is used for all computations until the bit is changed.

While a particular preferred embodiment has been described, it should be understood that a number of variations are possible within the scope of the invention. For example, the various circuit configurations shown in terms of AND/OR logic may be implemented by means of NAND-NAND logic or NOR-NOR logic if desired. The circuit configurations may also be subject to modification. Further, while operation has been described in terms of a particular arithmetic unit and a particular output printer, modifications in this respect are also possible.

Similarly, the interface between the arithmetic unit and the printer, constructed of individual shift register stages for each character could be modified, if desired by providing a fewer number of shift register stages which would then be employed to extract information from selected time frames of the multiplexed output data from the arithmetic unit. Separate shift register stages could still be provided for reference data stored in the input registers which is to be printed.

In the latter regard, although the printout format described includes only the result of the computation and the footage drilled, it will be appreciated that depending upon the printout capacity, additional data such as the total drill time could also be printed out.

Also, because of the convenient data and command access to the arithmetic unit through a matrix such as illustrated in FIG. 3, direct arithmetic capability may be added by providing a keyboard for separately controlling the matrix and function solenoids, or even a separate matrix having keyboard controlled crosspoints connected in parallel with existing matrix 65. This allows the system to be used both for its preprogrammed function as described, and also as a calculator for normal arithmetic operations. Display under these conditions would be either by the LED display unit 244 or by the printer, or both, if desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = *cost per foot of the hole being drilled;*
$B$ = bit cost in dollars;
$T$ = round trip bit changing time in hours
$D$ = actual time drilled
$R$ = rig cost in dollars per hour
$F$ = number of feet actually drilled output display means; and means responsive to completion of said computation for actuating said output display means to provide a record of the result of said computation, said first memory means comprising three manually adjustable registers, each having storage capacity for at least one decimal digit; means responsive to selection of a digit to be stored to establish a unique code pattern representative thereof; a control input connected to said program control means and a plurality of outputs; each said register being responsive to a signal at said control input to generate said electrical representation at said outputs corresponding to said unique code pattern; said coupling means comprising means connecting the outputs of each of said registers in parallel.

2. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = cost per foot of the hole being drilled;
$B$ = bit cost in dollars;
$T$ = round trip bit changing time in hours
$D$ = actual time drilled
$R$ = rig cost in dollars per hour
$F$ = number of feet actually drilled output display means; and means responsive to completion of said computation for actuating said output display means to provide a record of the result of said computation, said means for generating said total drilling time indication comprising timing means for providing a series of electrical clock pulses at predetermined intervals; and wherein said second memory means includes a register having a storage capacity for at least one decimal digit, said register including a state advance input, connected to said timing means, a gating input connected to said program control means, and a plurality of signal outputs, said register being responsive to said series of clock pulses to advance through a decimal counting cycle, and to a gating signal to generate a pattern of outut signals dependent on the particular counting state at that time.

3. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = cost per foot of the hole being drilled;
$B$ = bit cost in dollars;
$T$ = round trip bit changing time in hours
$D$ = actual time drilled
$R$ = rig cost in dollars per hour
$F$ = number of feet actually drilled output display means; and means responsive to completion of said computation for actuating said output display means to provide a record of the result of said computation, said means for generating said depth drilled indication comprising means for measuring drilling depth, means responsive to measurement of predetermined depth increments to generate an electrical pulse and wherein said second memory means includes a register having a storage capacity for at least one decimal digit, said register including a state advance input, connected to said pulse generator, a gating input connected to said program control means, and a plurality of signal outputs, said register being responsive to said electrical pulses to advance through a decimal counting cycle, and to a gating signal to generate a pattern of output signals dependent on the particular counting state at that time.

4. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = cost per foot of the hole being drilled;
$B$ = bit cost in dollars;
$T$ = round trip bit changing time in hours
$D$ = actual time drilled
$R$ = rig cost in dollars per hour
$F$ = number of feet actually drilled output display means; and means responsive to completion of said computation for actuating said output display means to provide a record of the result of said computation, said first and second memory means each comprising a register for each data quantity to be stored, each of said registers including a gating input and a plurality of outputs, means coupling said gating input to said program control means, each register being responsive to a signal at its gating input to generate a pattern of output signals uniquely representing the value of the data stored in said register; and wherein said program control means includes scanning means for providing gating inputs to said registers in a predetermined sequence.

5. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = cost per foot of the hole being drilled;
$B$ = bit cost in dollars;
$T$ = round trip bit changing time in hours
$D$ = actual time drilled
$R$ = rig cost in dollars per hour
$F$ = number of feet actually drilled output display means; and means responsive to completion of said computation for actuating said output display means to provide a record of the result of said computation, said first and second memory means each comprising a register for each data quantity to be stored, each of said registers including a gating input and a plurality of outputs, means coupling said gating input to said program control means, each register being responsive to a signal at its gating input to generate a pattern of output signals uniquely representing the value of the data stored in said register; and wherein said program control means includes scanning means for providing gating inputs to said registers in a predetermined sequence, each of said registers comprising a plurality of contact pairs, means for closing said contact pairs in a predetermined sequence to define the value of the data stored in said register, means connecting one contact of each contact pair to different ones of said register outputs, and means connecting the other contact of each contact pair in common to the gating input of said register.

6. A data processing machine as defined in claim 5 wherein said predetermined contact closure sequence defines an 8421 Binary Coded Decimal code at said register outputs.

7. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = cost per foot of the hole being drilled;
$B$ = bit cost in dollars;
$T$ = round trip bit changing time in hours
$D$ = actual time drilled
$R$ = rig cost in dollars per hour
$F$ = number of feet actually drilled output display means; and means responsive to completion of said computation for actuating said output display means to provide a record of the result of said computation, said first and second memory means each comprising a register for each data quantity to be stored, each of said registers including a gating input and a plurality of outputs, means coupling said gating input to said program control means, each register being responsive to a signal at its gating input to generate a pattern of output signals uniquely representing the value of the data stored in said register; and wherein said program control means includes scanning means for providing gating inputs to said registers in a predetermined sequence, the outputs of all of said registers being connected in parallel with corresponding outputs of each register being connected together.

8. A data processing machine as defined in claim 7 wherein said scanning means comprises means for selectively applying electrical ground to the gating inputs of said registers.

9. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = cost per foot of the hole being drilled;
$B$ = bit cost in dollars;
$T$ = round trip bit changing time in hours
$D$ = actual time drilled
$R$ = rig cost in dollars per hour
$F$ = number of feet actually drilled output display means; and means responsive to completion of said computation for actuating said output display means to provide a record of the result of said computation, said program control means comprising means for establishing a plurality of program intervals including means for generating a train of timing pulses, counter means adapted to be advanced in response to said timing pulses, and decoder means having a plurality of outputs at least equal in number to the number of program intervals, said decoder means being responsive to the state of said counter to provide a predetermined signal at one output and a different signal at all the other outputs.

10. A data processing machine as defined in claim 9 wherein said program intervals include a rest interval, data transfer intervals, and operating command intervals, and means responsive to entry of said decoder into the state corresponding to said rest interval for inhibiting said counter to prevent advance in response to said timing pulses.

11. A data processing machine as defined in claim 10 including means responsive to decoder states corresponding to at least one program interval other than said rest interval for inhibiting said counter for a period exceeding the repetition period of said timing pulses.

12. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
C = cost per foot of the hole being drilled;
B = bit cost in dollars;
T = round trip bit changing time in hours
D = actual time drilled
R = rig cost in dollars per hour
F = number of feet actually drilled output display means; and means responsive to completion of said computation for actuating said output display means to provide a record of the result of said computation, said program control means including clock means for generating a plurality of repetition rates and means responsive to pulses at a selected one of said repetition rates for actuating said memory means and said arithmetic unit to perform a computation.

13. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
C = cost per foot of the hole being drilled;
B = bit cost in dollars;
T = round trip bit changing time in hours
D = actual time drilled
R = rig cost in dollars per hour
F = number of feet actually drilled output display means; and means responsive to completion of said computation for actuating said output display means to provide a record of the result of said computation, said program control means including clock means for generating a plurality of repetition rates and means responsive to pulses at a selected one of said repetition rates for actuating said memory means and said arithmetic unit to perform a computation, including means for preventing storage of operating time and footage drilled information in said second memory means while a computation is in progress 14. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
C = cost per foot of the hole being drilled;
B = bit cost in dollars;
T = round trip bit changing time in hours
D = actual time drilled
R = rig cost in dollars per hour
F = number of feet actually drilled output display means; and means responsive to completion of said computation for actuating said output display means to provide a record of said computation, said program control means including means for initiating a computation at preselected intervals; means responsive to initiation of a computation for generating a succession of program state identification signals; means for coupling predetermined ones of said program state signals to each of said first and second memory means to generate said electrical representations of the stored data and to provide said representations to said arithmetic unit, operating control means responsive to predetermined ones of said program state signals to provide operating commands to said arithmetic unit, and output means responsive to at least one of said program state signals to transfer data signals representative of the result of a computation to said display means.

15. A data processing machine as defined inn claim 14 wherein the data stored in each of said memory means comprises a plurality of decimal digits, said memory means being responsive to individual ones of said program state signals for generating electrical signal code representations of each of said decimal digits in a predetermined order.

16. A data processing machine for determining the optimum utilization time for a well drilling bit in terms of the minimum value of the average cost per foot of hole being drilled with the bit comprising:

memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = cost per foot of the hole being drilled;
$B$ = bit cost in dollars;
$T$ = round trip bit changing time in hours
$D$ = actual time drilled
$R$ = rig cost in dollars per hour
$F$ = number of feet actually drilled
output display means; and means responsive to completion of said computation for actuating said output display means to provide a record of the result of said computation, said arithmetic unit comprising a plurality of inputs including decimal digit inputs and operating command inputs, and means for scanning said inputs to enter data and operating commands appearing at said inputs; said arithmetic unit being operative in response to entry of a first operand comprising at least one digit followed by a first operating command, and thereafter followed by a second operand comprising at least one data digit to perform the commanded operation on said first and second operands, and for providing an electrical signal code representation of the result of said operation in a time multiplexed format with the signal code representing each digit of said result occupying a separate time frame.

17. A data processing machine as defined in claim 16 wherein said operation in accordance with said first operating command is performed upon entry of a second operating command following said second operand.

18. A data processing machine for determining the optimum utilization time for a well drilling bit in terms of the minimum value of the average cost per foot of hole being drilled with the bit comprising:
memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = cost per foot of the hole being drilled;
$B$ = bit cost in $;
$T$ = round trip bit changing time in hours;
$D$ = actual time drilled;
$R$ = rig cost in $ per hour;
$F$ = number of feet actually drilled
output display means; and means responsive to completion of said computation for actuating said output display means to provide a record of the result of said computation, including means for initiating successive computations at selected intervals; and means for comparing the result of two successive computations and for providing an indication when the result of a computation exceeds that of the immediately preceding computation.

19. A data processing machine for determining the optimum utilization time for a well drilling bit in terms of the minimum value of the average cost per foot of hole being drilled with the bit comprising:
memory means for storing information representing the replacement cost of the bit, the hourly operating cost of the drilling rig, and the estimated time required to replace the bit; means for generating an indication of the total drilling time for the bit; means for generating an indication of the depth drilled with the bit; second memory means for storing said total drilling time and depth drilled indications; an arithmetic processing unit; means for coupling said first and second memory means to said arithmetic unit; program control means including means for operating said coupling means to transfer electrical representations of said bit cost, said rig cost, and said bit replacement time information, and said drilling time and footage drilled indications to said arithmetic unit, and means for operating said arithmetic unit to compute a solution to the equation:

$$C = [B + (T + D)R]/F$$

where:
$C$ = cost per foot of the hole being drilled;
$B$ = bit cost in dollars;
$T$ = round trip bit changing time in hours
$D$ = actual time drilled
$R$ = rig cost in dollars per hour
$F$ = number of feet actually drilled
output display means; and means responsive to completion of said computation for actuating said output display means to provide a record of the result of said computation, said arithmetic unit including input means comprising first and second groups of signal terminals, means for applying signals in succession to each of the terminals of said first group of terminals, means for detecting signals at the terminals of said second group, means for correlating signals applied to said first terminals with signals detected at said second terminals to define data and operating command inputs, a set of externally controllable switches connecting selected ones of said first and second terminals and control means responsive to signals from said first and second memory means and said program control means for selectively actuating said switches.

20. A data processing machine as defined in claim 19 wherein each of said switches comprises a pair of moveable contacts and wherein said control means comprises a plurality of solenoids each connected to a respective one of said contact pairs.

21. A data processing machine as defined in claim 19 including a further set of switches connected in parallel with respective ones of said first set of switches and means for manually actuating each of said further switches.

22. A data processing machine for determining the optimum utilization time for a well drilling bit in terms of the minimum value of the average cost per foot of hole being drilled with the bit comprising:

first memory means for storing a representation of the total drilling time for the bit; second memory means for storing a representation of the estimated trip time required to replace the bit; third memory means for storing a representation of the operating cost for the drilling rig; fourth memory means for storing a representation of the cost of the bit; fifth memory means for storing a representation of the total depth drilled with the bit; program control means comprising means for generating signals defining a succession of program state intervals; means for connecting at least a first one of said program state interval signals to said first memory means, at least a second one of said program state interval signals to said second memory means, at least a third one of said program state interval signals to said third memory means, at least a fourth one of said program state interval signals to said fourth memory means, and at least a fifth one of said program state interval signals to said fifth memory means; each of said memory means being responsive to program state interval signals provided thereto to generate an electrical signal representation of the data stored therein; an arithmetic unit for computing the value of $$C = [B + (T + D)R]/F$$

where:
- $C$ = the cost per foot,
- $B$ = the bit cost,
- $T$ = total trip time,
- $R$ = the operating cost of the drilling rig,
- $F$ = the depth drilled,
- $D$ = total drill time;

said arithmetic unit comprising input means including a first set of inputs responsive to signals provided thereto for entering numerical data in a decimal format one character at a time, and a second set of inputs responsive to signals provided thereto for entering arithmetic operation commands for addition, multiplication, division and totalization; said program control means being operative to generate additional signals defining a succession of further program state interval signals, one of said further program state interval signals occuring between successive ones of said first through said fourth program state interval signals and after said fifth program state interval signals; and means responsive to said additional program state interval signals for actuating said second set of arithmetic unit inputs to provide an addition command between said first and second program state interval signals, a multiplication command between said second and third program state interval signals, an addition command between said third and said fourth program state interval signals, a division command between said fourth and fifth program state interval signals, and a totalization command after said fifth program state interval signal.

23. A data processing machine as defined in claim 22 wherein each of said first through said fifth memory means comprises means for storing a multi-digit number, and wherein said program control means includes means to generate a program state interval signal for each digit stored in said memory means, means coupling one of said program state interval signals to each memory means for each digit stored therein; and means to provide one of said additional program state interval signals to said arithmetic unit following the last program state interval signal for each memory means.

24. A data processing machine as defined in claim 22 including means for initiating successive computations at selected intervals; and means for comparing the result of two successive computations and for providing an indication when the result of a computation exceeds that of the immediately preceding computation.

25. A data processing machine for determining the optimum utilization time for a well drilling bit in terms of the minimum value of the average cost per foot of hole being drilled with the bit comprising:

first memory means for storing a representation of the total drilling time for the bit; second memory means for storing a representation of the estimated trip time required to replace the bit; third memory means for storing a representation of the operating cost for the drilling rig; fourth memory means for storing a representation of the cost of the bit; fifth memory means for storing a representation of the total depth drilled with the bit; program control means comprising means for generating signals defining a succession of program state intervals; means for connecting at least a first one of said program state interval signals to said first memory means, at least a second one of said program state interval signals to said second memory means, at least a third one of said program state interval signals to said third memory means, at least a fourth one of said program state interval signals to said fourth memory means, and at least a fifth one of said program state interval signals to said fifth memory means; each of said memory means being responsive to program state interval signals provided thereto to generate an electrical signal representation of the data stored therein; and an arithmetic unit for computing the value of $$C = [B + (T + D)R]/F$$

where:
- $C$ = the cost per foot
- $B$ = the bit cost
- $T$ = total trip time
- $R$ = the operating cost of the drilling rig
- $F$ = the depth drilled
- $D$ = total drill time said arithmetic unit comprising input means including a first set of inputs responsive to signals provided thereto for entering numerical data in a decimal format one character at a time, and a second set of inputs responsive to signals provided thereto for entering arithmetic operation commands for addition, multiplication, division and totalization; said program control means being operative to generate additional signals defining a succession of further program state interval signals, one of said further program state interval signals occurring between successive ones of said first through said fourth program state interval signals and after said fifth program state interval signal; means responsive to said additional program state interval signals for actuating said second set of arithmetic unit inputs to provide an addition command between said first and second program state interval signals; a multiplication command between said second and third program state interval signals, an addition command between said third and said fourth program state interval signals, a division command between said fourth and fifth program state interval signals, and a totalization command after said fifth program state interval signal, said arithmetic unit being operative in response to entry of a first operand comprising at least one digit followed by a first operating command, and thereafter followed by a second operand comprising at least one data digit to perform the commanded operation on said first and second operands, and for providing an electrical signal code representation of the result of said operation in a time multiplexed format with the signal code representing each digit of said result occupying a separate time frame.

26. A data processing machine as defined in claim 25 wherein said operation in accordance with said first operating command is performed upon entry of a second operating command following said second operand.

27. A data processing machine for determining the optimum utilization time of a well drilling bit in terms of the minimum value of the cost per foot of the hole being drilled comprising first through fifth memory means for respectively storing indications of the total drilling time for the bit, the estimated round trip time for replacing the bit, the cost of the drilling rig, the cost of the bit, and the total depth drilled by the bit; an arithmetic unit responsive to numerical data and to control commands including addition, multiplication, division and totalization commands; input means coupling said memory means to said arithmetic unit, program control means operative to generate signals defining at least ten program state intervals; the first program state interval signal being operative to couple an electrical representation of the total drill time to said arithmetic unit, said second program state interval signal being operative to couple an addition command to said arithmetic unit, said third program state interval signal being operative to couple an electrical representation of the estimated round trip time for bit replacement to said arithmetic unit, said fourth program state interval signal being operative to couple a multiplication command to said arithmetic unit, said fifth program state interval signal being operative to couple an electrical representation of the operating cost for the drilling rig to said arithmetic unit, said sixth program state interval signal being operative to couple an addition command to said arithmetic unit, said seventh program state interval signal being operative to couple an electrical representation of the bit cost to said arithmetic unit, said eighth program interval signal being operative to couple a division command to said arithmetic unit, said ninth program state interval signal being operative to couple an electrical representation of the total depth drilled with the bit to said arithmetic unit, and said tenth program state interval signal being operative to couple a totalization command to said arithmetic unit; and display means for providing a visual indication of the result of the computation controlled by said first through said tenth program state interval signals.

28. A data processing machine for determining the optimum utilization time of a well drilling bit in terms of the minimum value of the cost per foot of the hole being drilled comprising first through fifth memory means for respectively storing indications of the total drilling time for the bit, the estimated round trip time for replacing the bit, the operating cost of the drilling rig, the cost of the bit, and the total depth drilled by the bit; an arithmetic unit responsive to numerical data and to control commands including addition, multiplication, division and totalization commands; input means coupling said memory means to said arithmetic unit, program control means operative to generate signals defining at least ten program state intervals; the first program state interval signal being operative to couple an electrical representation of the total drill time to said arithmetic unit, said second program state interval signal being operative to couple an addition command to said arithmetic unit, said third program state interval signal being operative to couple an electrical representation of the estimated round trip time for bit replacement to said arithmetic unit, said fourth program state interval signal being operative to couple a multiplication command to said arithmetic unit, said fifth program state interval signal being operative to couple an electrical representation of the operating cost for the drilling rig to said arithmetic unit, said sixth program state interval signal being operative to couple an addition command to said arithmetic unit, said seventh program state interval signal being operative to couple an electrical representation of the bit cost to said arithmetic unit, said eighth program state interval signal being operative to couple a division command to said arithmetic unit, said ninth program state interval signal being operative to couple an electrical representation of the total depth drilled with the bit to said arithmetic unit, and said tenth program state interval signal being operative to couple a totalization command to said arithmetic unit; and display means for providing a visual indication of the result of the computation controlled by said first through said tenth program state interval signals, said arithmetic unit being operable upon completion of a calculation operation to provide the results thereof in digital form on a time multiplexed basis with each digit of the result occuring on a separate time frame.

29. A data processing machine for determining the optimum utilization time of a well drilling bit in terms of the minimum value of the cost per foot of the hole being drilled comprising first through fifth memory means for respectively storing indications of the total drilling time for the bit, the estimated round trip time for replacing the bit, the operating cost of the drilling rig, the cost of the bit, and the total depth drilled by the bit; said memory means including means for storing a multidigit decimal number; an arithmetic unit responsive to numerical data and to control commands including addition, multiplication, division and totalization commands; input means coupling said memory means to said arithmetic unit, program control means operative to generate signals defining a plurality of program state intervals; a first group of program state interval signals being operative to couple an electrical representation of each digit of the total drill time indication to said arithmetic unit in a predetermined order, the program state interval signal following the first group of program state interval signals being operative to couple an addition command to said arithmetic unit, a second group of program state interval signals being operative to couple an electrical representation of each digit of the estimated round trip time indication to said arithmetic unit, the program state interval signal following said second set of program state interval signals being operative to couple a multiplication command to said arithmetic unit, a third group of program state interval signals being operative to couple an electrical representation of the operating cost indication to said arithmetic unit, the program state interval signal following the third group of program state interval signals being operative to couple an addition command to said arithmetic unit, a fourth group of program state interval signals being operative to couple an electrical representation of the bit cost indication to said arithmetic unit, the program interval signal following said fourth group of program state interval signals being operative to couple a division command to said arithmetic unit, a fifth group of program state interval signals being operative to couple an electrical representation of the total depth drilled indication to said arithmetic unit, and the program state interval signal following said fifth group of program state intervals signals being operative to couple a totalization command to said arithmetic unit; said arithmetic unit being operative in response to an arithmetic command input to execute the next preceding command.

30. A data processing machine as defined in claim 29 further including display means; and wherein said program control means is operative to generate at least one further program state interval signal following that operative to couple said totalization command to said arithmetic unit, said display means being operative in response to said further program state interval signal to display the result of the last arithmetic command executed by said arithmetic unit.

31. A data processing machine according to claim 30 wherein said display means comprises means responsive to said fifth group of program state interval signals to initiate display of said depth drilled indication, together with said computation result.

32. A data processing machine for determining the optimum utilization time of a well drilling bit in terms of the minimum value of the cost per foot of the hole being drilled comprising first through fifth memory means for respectively storing indications of the total drilling time for the bit, the estimated round trip time for replacing the bit, the operating cost of the drilling rig, the cost of the bit, and the total depth drilled by the bit; said memory means including means for storing a multi-digit decimal number; an arithmetic unit responsive to numerical data and to control commands including addition, multiplication, division and totalization commands; input means coupling said memory means to said arithmetic unit, program control means operative to generate signals defining a plurality of program state intervals; a first group of program state interval signals being operative to couple an electrical representation of each digit of the total drill time indication to said arithmetic unit in a predetermined order, the program state interval signal following the first group of program state interval signals being operative to couple an addition command to said arithmetic unit, a second group of program state interval signals being operative to couple an electrical representation of each digit of the estimated round trip time indication to said arithmetic unit, the program state interval signal following said second set of program state interval signals being operative to couple a multiplication command to said arithmetic unit, a third group of program state interval signals being operative to couple an electrical representation of the operating cost indication to said arithmetic unit, the program state interval signal following the third group of program state interval signals being operative to couple an addition command to said arithmetic unit, a fourth group of program state interval signals being operative to couple an electrical representation of the bit cost indication to said arithmetic unit, the program state interval signal following said fourth group of program state interval signals being operative to couple a division command to said arithmetic unit, a fifth group of program state interval signals being operative to couple an electrical representation of the total depth drilled indication to said arithmetic unit, and the program state interval signal following said fifth group of program state interval signals being operative to couple a totalization command to said arithmetic unit; said arithmetic unit being operative in response to an arithmetic command input to execute the next preceding command, said program state interval signals being pulses of substantially equal duration and following each other with no delay except for the signal which comprises the first signal of said fourth group, the latter following the preceding signal with a fixed delay period substantially exceeding the duration of all of said signals.

33. A data processing machine as defined in claim 32 including temporary output storage means connected to said arithmetic unit, and wherein said program control means is operative to generate a further program state interval signal following the one operative to couple said totalization command to said arithmetic unit, said further signal following its predecessor by said fixed delay period, said further signal being operative to store in said temporary storage means, the result of the last computation by said arithmetic unit.

* * * * *

UNITED STATES PATENT OFFICE
CERTIFICATE OF CORRECTION

Patent No. 3,752,966                  Dated August 14, 1973

Inventor(s)  Fred P. Foy Jr., et al.

It is certified that error appears in the above-identified patent and that said Letters Patent are hereby corrected as shown below:

In the Abstract, line 21, "numerical" should read -- result --.
Col. 1, line 38, "process" should read -- progress --; line 61, "pull bit" should read -- pull a bit --.
Col. 2, line 6, "act" should read -- fact --; line 56, the equation "C = [B + (T + D)R/F" should read -- C = [B + (T + D)R/F] --.
Col. 3, line 46, "information" should read -- Information --.
Col. 7, line 9, "sununit" should read -- subunit --; line 10, "xecpt" should read -- except --; line 15, "read out" should read -- "read out" --; line 26, "read out" should read -- "read out" --; line 44, "in" should read -- In --; line 47, "subunit" should read -- provided --; line 48, "except" should read -- capability. --; line 52, "cable" should be cancelled.
Col. 8, line 4, "arithemtic" should read -- arithmetic --; line 22, "illustrated" should read -- illustrated --;
Col. 9, line 66, "interval" should read -- internal --.
Col. 10, lines 31 and 34, "on" should read -- "on" --.
Col. 15, line 5, "signal" should read -- single --.
Col. 16, line 38, "suppression" should read -- zero compression --; line 59, "or OR" should read -- and OR --.
Col. 30, line 45, claim 15, "inn" should read -- in --.
Col. 35, line 29, claim 27, "cost" first occurrence should read -- operating cost --.

Signed and sealed this 25th day of June 1974.

(SEAL)
Attest:

EDWARD M. FLETCHER, JR.
Attesting Officer

C. MARSHALL DANN
Commissioner of Patents